US011508250B2

(12) United States Patent
Watkins, Jr.

(10) Patent No.: US 11,508,250 B2
(45) Date of Patent: Nov. 22, 2022

(54) NORMALIZATION AND CUMULATIVE ANALYSIS OF COGNITIVE EDUCATIONAL OUTCOME ELEMENTS AND RELATED INTERACTIVE REPORT SUMMARIES

(71) Applicant: East Carolina University, Greenville, NC (US)

(72) Inventor: Robert Todd Watkins, Jr., Chapel Hill, NC (US)

(73) Assignee: East Carolina University, Greenville, NC (US)

( * ) Notice: Subject to any disclaimer, the term of this patent is extended or adjusted under 35 U.S.C. 154(b) by 16 days.

(21) Appl. No.: 17/134,922

(22) Filed: Dec. 28, 2020

(65) Prior Publication Data
US 2021/0134171 A1 May 6, 2021

Related U.S. Application Data

(63) Continuation of application No. 15/794,342, filed on Oct. 26, 2017, now Pat. No. 10,878,711, which is a continuation of application No. 13/425,627, filed on Mar. 21, 2012, now abandoned.

(60) Provisional application No. 61/466,207, filed on Mar. 22, 2011.

(51) Int. Cl.
*G09B 7/00* (2006.01)

(52) U.S. Cl.
CPC ..................... *G09B 7/00* (2013.01)

(58) Field of Classification Search
CPC ............ G09B 5/00; G09B 7/00; G09B 19/00
See application file for complete search history.

(56) References Cited

U.S. PATENT DOCUMENTS

| | | | |
|---|---|---|---|
| 6,877,987 | B2 | 4/2005 | Kulack |
| 2003/0180698 | A1 | 9/2003 | Salerian |
| 2003/0198930 | A1 | 10/2003 | Stuppy |
| 2005/0196742 | A1 | 9/2005 | Harber et al. |
| 2006/0286539 | A1 | 12/2006 | Tidwell-Scheuring et al. |
| 2007/0031801 | A1 | 2/2007 | Tidwell-Scheuring |
| 2008/0187898 | A1 | 8/2008 | Hattie |
| 2009/0280460 | A1 | 11/2009 | Yaskin |
| 2010/0047758 | A1 | 2/2010 | McCurry et al. |
| 2010/0316986 | A1 | 12/2010 | de la Chica et al. |
| 2011/0212430 | A1 | 9/2011 | Smithmier et al. |
| 2012/0141968 | A1 | 6/2012 | Li et al. |

(Continued)

FOREIGN PATENT DOCUMENTS

| | | |
|---|---|---|
| JP | 11-296061 A | 10/1999 |
| JP | 2005-157621 | 6/2005 |
| JP | 2008-310787 | 6/2007 |

(Continued)

OTHER PUBLICATIONS

International Search Report Corresponding to International Application No. PCT/US2012/030037; dated Nov. 30, 2012; 12 Pages.

(Continued)

*Primary Examiner* — Peter R Egloff
(74) *Attorney, Agent, or Firm* — Myers Bigel, P.A.

(57) ABSTRACT

The systems, methods and associated devices electronically collect, report and generate normalized educational outcome summaries of multiple different educational inputs, including didactic, experiential and problem solving events and/or assessments.

14 Claims, 25 Drawing Sheets
(14 of 25 Drawing Sheet(s) Filed in Color)

(56) References Cited

U.S. PATENT DOCUMENTS

2012/0208168 A1    8/2012   Atkinson et al.
2014/0349272 A1    11/2014  Kutty et al.

FOREIGN PATENT DOCUMENTS

| KR | 10-2009-0096040 | 9/2009 |
| KR | 10-2010-0042636 | 4/2010 |
| KR | 10-1009380 B1 | 1/2011 |
| WO | WO 2010/066003 | 6/2010 |

OTHER PUBLICATIONS

Notification Concerning Transmittal of International Preliminary Report on Patentability, Application No. PCT/US2012/030037, dated Oct. 3, 2013, 9 pages.
Extended European Search Corresponding to European Application No. EP12760399.1 from PCT/US2012/030037; dated Jul. 8, 2014; 6 Pages.
Chinese Second Office Action Corresponding to Application No. 201280014075.4; dated Sep. 5, 2016; Foreign Text, 16 Pages, English Translation Thereof, 15 Pages.
Examiner's Report corresponding to Canadian Application No. 2,830,075 (7 pages), dated Aug. 21, 2018.
Notice of Preliminary Rejection corresponding to Korean Application No. 10-2013-7027083 (Foreign Text, 14 pages, English Translation Thereof, 20 Pages) (dated Jan. 18, 2018).

| Institution Name | | | | |
|---|---|---|---|---|
| Post Author | Type | MicroComps | RVU | Comments |
| Bill Student | Student Post Content | 01.01.01.01<br>01.01.01.02 | 1<br>2 | |
| Martha Student | Student Post Logistics | 01.01.01.02<br>01.01.01.03 | 1<br>2 | |
| Bill Student | Student Post Logistics | 01.01.01.01<br>01.01.01.02 | 1<br>2 | |
| Frank Faculty | Faculty Post Guidance | | | |
| Bill Student | Student Post Other | 01.01.01.04 | 4 | |

Faculty Post Case       0
Faculty Post Guidance   1
Faculty Post Other      0
Student Post Content    1
Student Post Logistics  2
Student Post Other      2

| Student | # Posts | Total RVUs |
|---|---|---|
| Bill Student | 3 | 11 |
| Martha Student | 2 | 10 |
| Total | 5 | 21 |

Submit

| Institution Name | |
|---|---|
| Student | Post content -content- content content Post content -content- content content Post content -content- content content Post content -content- content content Post content -content- content content Post content -content- content content |

Word Count: 32

Posting Type  [ ▼ ]

Microcompetency Codes:

[          ]  RVU: [ ▼ ]
[          ]  RVU: [ ▼ ]
[          ]  RVU: [ ▼ ]

Comments: [                    ]

Progress...75/100    Overview    [ Next ▶ ]    [ Submit ]

Competency Grid 01 - Quantitative Methods

01 – Concepts of Measurement
01.01.01.00
01.01.01.01 Scales of Measurement
01.01.01.02 Distribution
01.01.01.03 Central Tendency
01.01.01.04 Variability
01.01.01.05 Probability
01.01.01.06 Disease Prevalence
01.01.01.07 Disease Incidence
01.01.01.08 Disease Outcomes
01.01.01.09 Associations
01.01.01.10 Health Impact
01.01.01.11 Sensitivity
01.01.01.12 Specificity
01.01.01.13 Predictive Values 02 – Study Design
01.01.02.00
01.01.02.01 Types of Experimental Studies
01.01.02.02 Types of Observational Studies
01.01.02.03 Sampling and Sample Size
01.01.02.04 Subject Selection and Exposure Allocation
01.01.02.05 Outcome Assessment
01.01.02.06 Internal and External Validity 03 – Hypothesis Testing and Statistical Inference
01.01.03.00
01.01.03.01 Confidence Intervals
01.01.03.02 Statistical Significance and Type I Error
01.01.03.03 Statistical Power and Type II Error

FIG. 7A

Competency Grid 02 – Genetics and Embryogenesis

01 – Gene Expression
01.02.01.00
01.02.01.01 DNA structure
01.02.01.02 DNA Replication
01.02.01.03 Gene Structure and Organization
01.02.01.04 Recombination 02 – Gene Transcription
01.02.02.00
01.02.02.01 Transcription of DNA into RNA
01.02.02.02 Regulation 03 – Gene Translation
01.02.03.00
01.02.03.01 Genetic Code
01.02.03.02 Structure and Function of tRNA
01.02.03.03 Structure and Function of Ribosomes
01.02.03.04 Structure and Function of Proteins
01.02.03.05 Protein Synthesis
01.02.03.06 Regulation of Translation
01.02.03.07 Post-translational Modifications
01.02.03.08 Protein Degradation 04 – Embryogenesis
01.02.04.00
01.02.04.01 Programmed Gene Expression
01.02.04.02 Cleavage and Blastocyst Formation
01.02.04.03 Homeotic Genes 05 – Congenital and Developmental Abnormalities
01.02.05.00
01.02.05.01 Principles
01.02.05.02 Patterns of Anomalies
01.02.05.03 Dysmorphogenesis
01.02.05.04 Down's syndrome
01.02.05.05 Patau's syndrome
01.02.05.06 Edward's syndrome
01.02.05.07 Autosomal deletion syndromes
01.02.05.08 Balanced autosomal translocation
01.02.05.09 Gonadal dysgenesis
01.02.05.10 Klinefelter's syndrome
01.02.05.11 Hermaphrodite
01.02.05.12 Anencephalus and similar anomalies
01.02.05.13 Congenital anomalies of face, and neck
01.02.05.14 Multiple Congenital Anomalies
01.02.05.15 Disorders of Fetal Growth and Development
01.02.05.16 Morbidity Associated with Birth Process
01.02.05.17 Systemic Conditions Unique to The Newborn

FIG. 7B

Group: 20168019Blue
Course: 8019
Date:

| Post Author | Type | MicroCompe | PoU | Comments |
|---|---|---|---|---|
| | Student Post Logistics | | | |
| | Student Post Content | 02.03.02.00 | 0.1 | |
| | Student Post Logistics | | | |
| | Student Post Content | 02.03.02.00 | 0.1 | |
| | Student Post Content | 02.03.02.00 | 0.1 | |
| | Student Post Logistics | | | |
| | Student Post Content | 01.04.01.00 | 0.1 | |
| | Student Post Logistics | | | |
| | Student Post Other | | | |
| | Student Post Other | | | |
| | Student Post Logistics | | | |
| | Student Post Content | 01.04.01.00 | 0.2 | |
| | Student Post Logistics | | | |
| | Student Post Logistics | | | |
| | Student Post Content | 02.03.02.00 | 0.1 | |
| | Student Post Content | 02.03.11.00 | 0.1 | |
| | Student Post Content | 02.03.02.00 | 0.1 | |
| | Student Post Content | 02.03.11.00 | 0.2 | |
| | Student Post Content | 02.03.11.00 | 0.2 | |
| | Student Post Content | 02.03.02.00 | 0.1 | |
| | Student Post Content | 02.03.02.00 | 0.1 | |
| | Student Post Logistics | | | |
| | Student Post Logistics | | | |
| | Student Post Content | 02.03.02.00 | 0.1 | |
| | Student Post Content | 02.03.02.00 | 0.1 | |
| | Student Post Logistics | | | |
| | Student Post Logistics | | | |
| | Student Post Other | | | |
| | Student Post Other | | | |
| | Student Post Logistics | | | |
| | Student Post Content | 02.03.02.00 | 0.1 | |
| | Student Post Content | 02.03.02.00 | 0.1 | |
| | Student Post Content | 02.03.02.00 | 0.1 | |
| | Student Post Content | 02.03.02.00 | 0.1 | |
| | Student Post Logistics | | | |
| | Student Post Content | 02.03.04.00 | 0.1 | |
| | Student Post Logistics | | | |
| | Student Post Logistics | | | |
| | Student Post Logistics | | | |
| | Student Post Content | 02.03.04.00 | 0.1 | |
| | Student Post Content | 02.03.02.00 | 0.1 | |
| | Student Post Content | 02.03.02.00 | | |
| | Student Post Content | 02.03.04.00 | 0.2 | |
| | Student Post Content | 02.03.04.00 | 0.2 | |
| | Student Post Logistics | | | |
| | Student Post Logistics | 02.03.05.00 | 0.1 | |
| | Student Post Content | 02.03.05.00 | 0.2 | |
| | Student Post Logistics | | | |
| | Student Post Content | 02.03.05.00 | 0.2 | |
| | Student Post Logistics | | | |
| | Student Post Content | 02.03.05.00 | 0.1 | |
| | Student Post Content | 02.03.05.00 | 0.1 | |
| | Student Post Content | 02.03.02.00 | 0.1 | |
| | Student Post Content | 02.03.05.00 | 0.1 | |
| | Faculty Post Guidance | | | |
| | Student Post Logistics | | | |
| | Student Post Content | 01.09.03.00 | 0.2 | |
| | Student Post Logistics | | | |
| | Student Post Content | 01.09.03.00 | 0.2 | |

| RVU Commit Summary | |
|---|---|
| Name | RVUs |
| Student 1 | 4 |
| Student 2 | 4 |
| Student 3 | 4 |
| Student 4 | 4 |
| Student 5 | 4 |
| Student 6 | 4 |

Student Posts

☐ Student 1
  Student Post Content: 1 (0.1)
    02.03.04.00: 0.1
  Student Post Logistics: 1
  Student Post Other: 0

Student 2
  Student Post Content: 4 (0.4)
    01.04.01.00: 0.1
    02.03.11.00: 0.1
    02.03.02.00: 0.2
  Student Post Logistics: 3
  Student Post Other: 2

☐ Student 3
  Student Post Content: 11 (1.8)
    02.03.02.00: 0.4
    02.03.11.00: 0.2
    02.03.04.00: 0.3
    02.03.05.00: 0.4
    01.09.03.00: 0.2
  Student Post Logistics: 12
  Student Post Other: 0

Student 4
  Student Post Content: 9 (1)
    02.03.02.00: 0.6
    01.04.01.00: 0.2
    02.03.11.00: 0.2
  Student Post Logistics: 4
  Student Post Other: 1

☐ Student 5
  Student Post Content: 7 (1)
    02.03.02.00: 0.3
    02.03.04.00: 0.2
    02.03.05.00: 0.3
    01.09.03.00: 0.2
  Student Post Logistics: 2
  Student Post Other: 0

Student 6
  Student Post Content: 0 (0)
  Student Post Logistics: 0
  Student Post Other: 1

Group Overview

✓ Group Totals
  Student Post Content: 32 (4)
    02.03.02.00: 1.5
    01.04.01.00: 0.3
    02.03.11.00: 0.5
    02.03.04.00: 0.6
    02.03.05.00: 0.7
    01.09.03.00: 0.4
  Student Post Logistics: 22
  Student Post Other: 4

FIG. 14

East Carolina University

| Home Page | Competency Grids | Data Sources | Grid Manager |

Current Grids

| Name | User Access | |
|---|---|---|
| 00 - Uber Competency Grid | | |
| 00C - Uber Competency Grid (clinical) | | |
| 00D - Uber Competency Grid (discussion) | | |
| 00X - Uber Competency Grid (exam) | | |
| 01 - Quantitative Methods | | |
| 02 - Genetics and Embryogenesis | | |
| 03 - Anatomy Discipline | | |
| 04 - Cell Biology and Metabolism | | |
| 05 - Human Immunity | | |
| 06 - Physiology Discipline | | |
| 07 - Pathology Discipline (and Microbiology) | | |
| 08 - Pharmacology Discipline | | |
| 09 - Integument | | |
| 10 - Musculoskeletal System | | |
| 11 - Nervous System(s) | | |
| 12 - Endocrine System | | |
| 13 - Cardiovascular System (Blood and Lymphatics) | | |
| 14 - Respiratory System | | |
| 15 - Digestive System (Oral Detail) | | |
| 15C - Digestive System (Oral Detail) | | |
| 16 - Oral and Dental Pathology | | |
| 16C - Oral and Dental Pathology (clinical) | | |
| 17 - Digestive System (Non-Oral) | | |
| 18 - Urinary System | | |
| 19 - Reproductive Systems | | |
| 20 - Patient Considerations | | |
| 21 - Physician Considerations | | |
| 22 - Health Care Issues | | |
| 23 - Dental / Oral Pain Control | | |

FIG. 17

Data Sources:
☑ Clinical
☑ Didactic
☑ Discussion

Date Range: Include scores within the follow date range. Start: 2011-06-01  End: 2016-06-30

FIG. 19

User Access:   Included         Excluded
                                Faculty 1
                                Faculty 2
                                Student 1
                                Student 2
                                Student 3
                                Student 4
                                Student 5
                                Student 6
                                Student 7
                                Student 8
                                Student 9
                                Student 10

| RVU Commit Summary ||
|---|---|
| Name | RVUs |
| Student | 51.0 |
| Student | 51.0 |
| Student | 54.0 |
| Student | 40.0 |
| Student | 50.0 |
| Student | 43.0 |
| Student | 45.0 |
| Student | 46.0 |
| Student | 48.0 |
| Student | 57.0 |
| Student | 48.0 |
| Student | 52.0 |
| Student | 48.0 |
| Student | 54.0 |
| Student | 45.0 |
| Student | 54.0 |
| Student | 48.0 |
| Student | 50.0 |
| Student | 52.0 |
| Student | 52.0 |
| Student | 46.0 |
| Student | 56.0 |
| Student | 53.0 |
| Student | 56.0 |
| Student | 39.0 |
| Student | 41.0 |
| Student | 49.0 |
| Student | 54.0 |
| Student | 39.0 |
| Student | 53.0 |
| Student | 39.0 |
| Student | 51.0 |
| Student | 50.0 |
| Student | 50.0 |
| Student | 52.0 |
| Student | 53.0 |
| Student | 54.0 |
| Student | 52.0 |
| Student | 49.0 |
| Student | 43.0 |
| Student | 54.0 |
| Student | 54.0 |
| Student | 49.0 |
| Student | 51.0 |
| Student | 50.0 |
| Student | 40.0 |
| Student | 52.0 |
| Student | 48.0 |
| Student | 44.0 |
| Student | 55.0 |
| Student | 56.0 |
| Student | 51.0 |

FIG. 27

NORMALIZATION AND CUMULATIVE ANALYSIS OF COGNITIVE EDUCATIONAL OUTCOME ELEMENTS AND RELATED INTERACTIVE REPORT SUMMARIES

RELATED APPLICATIONS

This application is a continuation application of, and claims priority to, U.S. application Ser. No. 15/794,342 filed Oct. 26, 2017, which is a continuation application of, and claims priority to, U.S. application Ser. No. 13/425,627 filed Mar. 21, 2012, which claims the benefit, under 35 U.S.C. § 119(e), of U.S. Provisional Application Ser. No. 61/466,207, filed Mar. 22, 2011, entitled "NORMALIZATION AND CUMULATIVE ANALYSIS OF COGNITIVE EDUCATIONAL OUTCOME ELEMENTS AND RELATED INTERACTIVE REPORT SUMMARIES", the disclosures of which are incorporated herein in their entireties by reference.

COPYRIGHT PROTECTED MATERIAL

A portion of the disclosure of this patent document contains material which is subject to copyright protection. The copyright owner, East Carolina University of Greenville, N.C., has no objection to the reproduction by anyone of the patent document or the patent disclosure, as it appears in the Patent and Trademark Office patent file or records, but otherwise reserves all copyright rights whatsoever.

FIELD OF THE INVENTION

The invention relates to educational assessment systems that can evaluate student competency in different sub-topics related to an educational topic, concept or field and/or evaluate cohort factors associated with positive and negative cognitive test outcomes.

BACKGROUND

In the past, educational and testing systems were designed to evaluate students based primarily on didactic based tests. To automate such evaluations, the use of microcompetency codes for curriculum mapping of didactic topics has been proposed. Others have used MeSH (Medical Subject Heading) codes for certain types of educational evaluations of medical curriculums. However, these codes have not resulted in a practical way to evaluate students, particularly in a manner that can consider other types of input. Indeed, such prior approaches are only able to evaluate students for topics presented in didactic environments.

Many educational programs should require proof of knowledge, skills, and inter-disciplinary problem solving. However, it is difficult to assess these different educational outcomes longitudinally. For example, in dental and medical education, and other educational fields, it is believed that a greater degree of student competencies should be based on other factors, e.g., over 60% of the student competence should be measured in clinical environments.

There remains a need for alternate evaluation systems that can provide improved competency-based assessments.

SUMMARY

Some embodiments of the present invention are directed to methods for providing data for evaluating student competency. Such methods may include generating an evaluation grid for at least one student. The grid may include multiple different microcompetencies, multiple scores that are associated with corresponding ones of the different microcompetencies, the scores corresponding to at least one didactic event, at least one experiential event, and at least one discussion event. Some embodiments provide that generating the evaluation grid is performed using at least one computer processor.

In some embodiments, ones of the scores for corresponding ones of the different microcompetencies are relative educational value (RVU) scores and each of the at least one didactic event, the at least one experiential event and the at least one discussion event that is used to generate a respective score is associated with a metadata code identifying a topic code corresponding to ones of the different microcompetencies and RVU scores. In some embodiments, generating the evaluation grid is performed using the metadata codes.

Some embodiments further include accumulating RVU scores for different didactic events, experiential events and discussion events, correlated to respective students over time and updating the evaluation grid based on the accumulated RVU scores. In some embodiments, the grid is updated at a substantially regular periodic interval. Some embodiments provide that the substantially regular periodic interval is at least a weekly interval to reflect changes in student scores corresponding to ones of the plurality of different microcompetencies.

In some embodiments, the RVU scores from each event are time-normalized scores and the didactic and experiential RVU scores are based on binary characterizations of test and experience events. Some embodiments provide that the experiential environment RVU scores are based on a predefined assessment of difficulty and an estimated time to complete a respective experiential task and the experiential task is associated with more than one topic code corresponding to ones of the different microcompetencies.

Some embodiments provide that the discussion environment RVU scores are based on user-defined RVU scores for a student that are assigned after evaluating a student online discussion.

In some embodiments, the grid is an interactive grid. Some embodiments further include allowing a user to select a cell in the grid to reveal underlying supporting data of a respective microcompetency and/or student.

Some embodiments include displaying the grid with cells in a respective microcompetency having a color that is associated with a defined status. In some embodiments, the defined status corresponds to a relative performance of the student among a plurality of other students in a plurality of the students that includes the student. Some embodiments provide that the relative performance is based on a standard deviation of the RVU scores for the plurality of students and cells in the grid in a respective microcompetency are displayed using a first color that corresponds to a score identified as being below a statistically defined minimum, a second color that corresponds to a score that is above the statistically defined minimum and below a statistically defined excellence threshold, and a third color that corresponds to a score that is above the statistically defined excellence threshold. In some embodiments, cells in the grid in a respective microcompetency are displayed using the first color that corresponds to a score identified as being below a non-statistically defined minimum exclusive of the statistically defined minimum. Some embodiments provide that cells in the grid in a respective microcompetency are displayed using the third color that corresponds to a score that is above a non-statistically defined excellence threshold exclusive of the statistically defined excellence threshold.

Some embodiments of the present invention include methods of providing data for evaluating a student's competency in a topic. Such methods may include obtaining relative educational value unit (RVU) scores for different defined microcompetencies by electronically identifying associated ones of a plurality of metadata codes for a plurality of different microcompetencies that are correlated to student identifiers from didactic, experiential and discussion environments over time. Methods may also include storing the obtained RVU scores in association with supporting reports.

Some embodiments include generating a cumulative analysis grid based on the RVU scores. In some embodiments, generating the cumulative analysis grid includes mathematically summing RVU scores from each of the didactic, experiential and discussion environments for respective ones of the plurality of different microcompetencies and updating the cumulative analysis grid based on subsequently obtained cumulative data for respective students.

In some embodiments, didactic RVU scores are based on binary characterizations of test events and experiential RVU scores are based on binary characterizations of experiential events.

Some embodiments provide that obtaining relative educational value unit (RVU) scores includes receiving an exam data file that corresponds to each didactic event, the exam data file including a unique student identifier, a test item identifier, a microcompetency code corresponding to the test item and a binary answer choice value. Some embodiments include modifying the received exam data file to include at least one of a program identifier, an exam date and a course identifier and storing the modified exam data file.

Some embodiments further include programmatically validating the modified exam data file by comparing contents therein with contents of the exam data file. Some embodiments further include displaying content of the exam data file for validation by a user.

Some embodiments further include receiving a commitment input and, responsive to receiving the commitment input, converting data from the modified exam data file into summary data correlated by microcompetency to provide topic-associated results. Some embodiments further include receiving a validation input that indicates that the summary data correlated by microcompetency is approved and, responsive to receiving the validation input, generating aggregate data that associates RVU scores corresponding to the summary data with corresponding students. Some embodiments include receiving a commitment input that indicates that the aggregate data is approved, tagging a file corresponding to the aggregate data, the summary data and/or the modified exam data as committed, and updating a cumulative analysis grid based on RVU scores in the aggregate data.

Some embodiments of the present invention include one or more circuits configured to generate an interactive cumulative grid of a plurality of defined educational topics associated with a cognitive competency of a student.

Some embodiments of the present invention include computer program products for providing competency-based student evaluations. Such computer program products may include a non-transitory computer readable storage medium having computer readable program code embodied in the medium. In some embodiments, the computer-readable program code includes computer readable program code that generates a summative grading output based on an evaluation of didactic test events associated with defined associated microcompetency topic codes and relative educational value units. Embodiments may include computer readable program code that generates a summative grading output based on an evaluation of experiential individual experience elements associated with defined associated microcompetency topic codes and relative educational value units and computer readable program code that generates a summative grading output based on an evaluation of individual discussion events associated with defined associated microcompetency topic codes and relative educational value units. Embodiments may further include computer readable program code that generates a cumulative analysis student evaluation grid using the summative grading outputs.

In some embodiments, the cumulative analysis student evaluation grid using the summative grading outputs includes cells in the grid that are displayed in a respective microcompetency having a color that is associated with a defined status. Some embodiments provide that the defined status corresponds to a relative performance of the student among a plurality of other students in a plurality of the students that includes the student based on a standard deviation of the relative educational value units for the plurality of students, a non-statistically defined minimum that is defined independent of the plurality of other students and a non-statistically defined excellence threshold that is defined independent of the plurality of other students.

Some embodiments of the present invention include educational analysis systems that include at least one web-based service with at least one server that is configured to accept electronic input from professors/teachers and students to communicate with the web-based service to interactively participate in timed discussion events with students and student groups, and wherein the system is configured to provide an input window to allow professors/teacher to input microcompetency codes and relative educational value unit scores for a respective discussion event for each student and each student group participating in the discussion event.

In some embodiments, the at least one web-based service is further configured to use metadata codes to relate defined individual experiential events with an associated one of the microcompetency codes and at least one of the relative educational value units.

As will be appreciated by those of skill in the art in light of the above discussion, the present invention may be embodied as methods, systems and/or computer program products or combinations of same. In addition, it is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 3 is a block diagram illustrating a display screen in a graphical user interface of an exemplary discussion event input according to some embodiments of the present invention.

FIG. 4 is a block diagram illustrating a display screen of an exemplary discussion event input according to some embodiments of the present invention.

FIG. 5 is a screen shot of an example of a discussion thread and associated CSV file according to some embodiments of the present invention.

FIGS. 7A and 7B are competency grid listings of two respective sets of associated microcompetencies according to some embodiments of the present invention.

FIG. 13 is a screen shot of a graphical user interface for a summative report after grading according to some embodiments of the present invention.

FIG. 14 is a screen shot of a graphical user interface for a post verification report before the data is submitted to the grid according to some embodiments of the present invention.

FIG. 17 is a partial screen shot of a graphical user interface for a managing an interactive evaluation grid where multiple grids are presented for editing according to some embodiments of the present invention.

FIG. 19 is a partial screen shot of a graphical user interface including a component of an interactive evaluation grid that allows selective viewing of one or more modalities and for the definition of an analysis date range according to some embodiments of the present invention.

FIG. 20 is a screen shot of a graphical user interface of a cohort manager that determines which students and faculty are included in a particular cohort according to some embodiments of the present invention.

FIG. 22 is a screen shot of a graphical user interface illustrating raw imported exam data for a single student after an item analysis has been performed according to some embodiments of the present invention.

FIG. 23 is a screen shot of a graphical user interface for verifying a raw data report in preparation for validation according to some embodiments of the present invention.

FIG. 24 is a screen shot of a graphical user interface illustrating an RVU Commit Summary screen before data is committed according to some embodiments of the present invention.

FIG. 25 is a screen shot of a graphical user interface illustrating data that was collected and merged by microcompetency code for different students according to some embodiments of the present invention.

FIG. 26 is a screen shot of a graphical user interface illustrating data that was collected and merged by microcompetency code and that is verified to provide all students with the correct score according to some embodiments of the present invention.

FIG. 27 is a screen shot of a graphical user interface illustrating an RVU Commit Summary screen that includes RVU scores ready to commit to one or more data bases for the grid according to some embodiments of the present invention.

DETAILED DESCRIPTION

Figure 1:
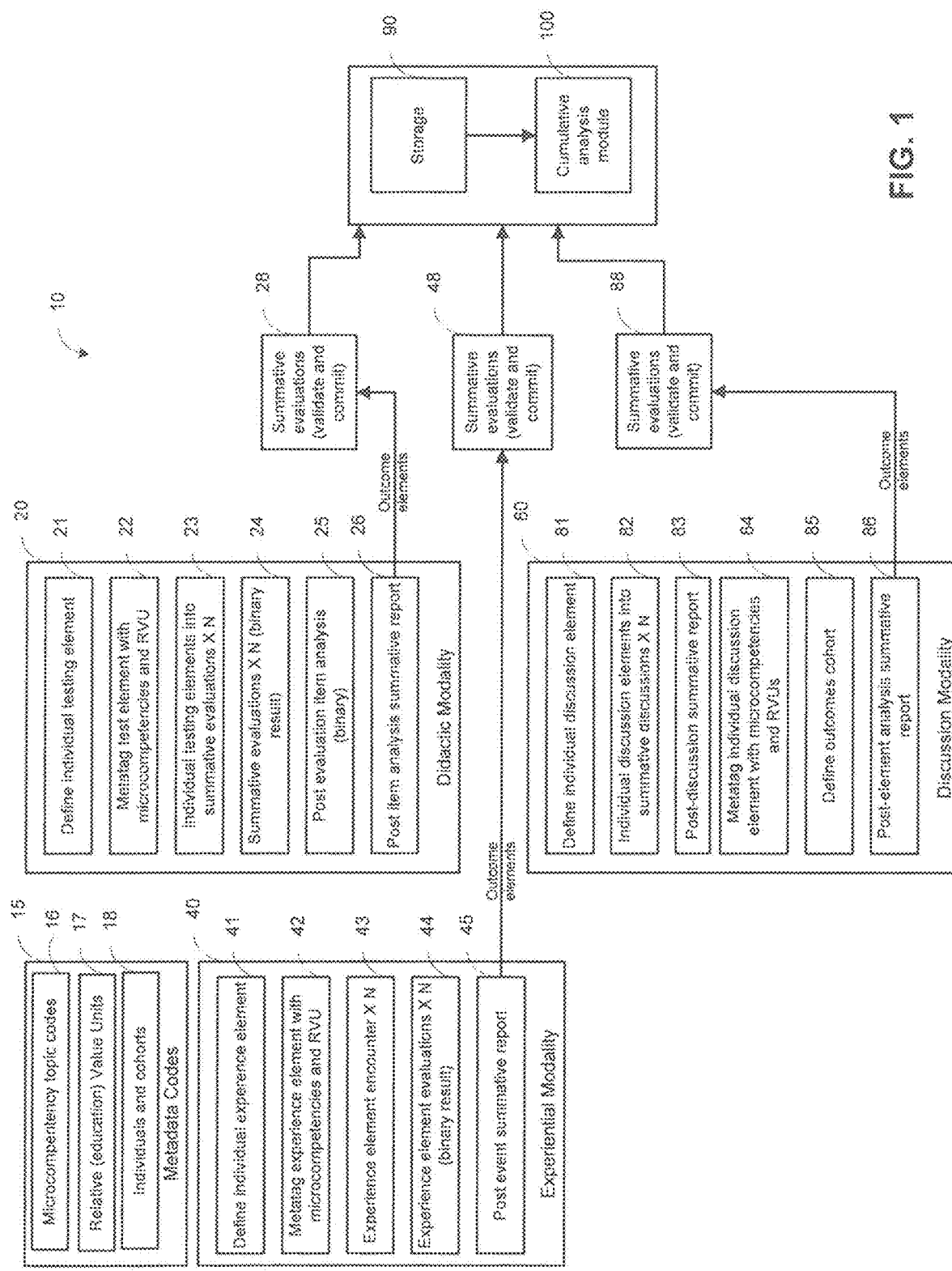
FIG. 1 is a schematic illustration of an evaluation system/method according to some embodiments of the present invention.

The present invention will now be described more fully hereinafter with reference to the accompanying figures, in which preferred embodiments of the invention are shown. This invention may, however, be embodied in many different forms and should not be construed as limited to the embodiments set forth herein.

Like numbers refer to like elements throughout. In the figures, layers, regions, or components may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, etc. may be used herein to describe various elements, components, regions, features, steps, layers and/or sections, these elements, components, features, steps, regions, layers and/or sections should not be limited by these terms. These terms are only used to distinguish one element, component, feature, step, region, layer or section from another region, layer or section. Thus, a first element, component, region, layer, feature, step or section discussed below could be termed a second element, component, region, layer, feature, step or section without departing from the teachings of the present invention. The sequence of operations (or steps) is not limited to the order presented in the claims or figures unless specifically indicated otherwise.

The term "student" refers to the individual(s) being evaluated. As used herein, the term "substantially real time" includes receiving and/or transmitting data between sites during a discussion or test accounting for system delays in remote transmission between sites which may be on the order of seconds or less or potentially minutes in length as a result of routing, traffic, transmission route and/or system communication link employed which can impede the transfer such that slight delays may occur.

The term "automatic" means that substantially all or all of the operations so described can be carried out without requiring the assistance and/or manual input of a human operator. The term "electronic" means that the system, operation or device can communicate using any suitable electronic media and typically employs programmatically controlling the communication between participants using a computer network.

The term "programmatically" means the action is directed via a computer program code.

The term "hub" means a node and/or control site (or sites) that controls and/or hosts data exchange between different user sites using a computer network. The term "FERPA" refers to the Family Educational Rights and Privacy Act (FERPA) under the laws of the United States of America.

The term "formative evaluation" refers to a cross-sectional event where individuals are provided guidance to improve performance. Formative evaluations are not required to be submitted for grades or points.

The term "summative evaluation" refers to a a cross-sectional event where individuals are given an evaluation of performance in the form of points or grades.

The term "outcome element" is a unit of defined educational outcome as part of a summative evaluation. An outcome element may contain the following data: unique identifier, student unique identifier, summative assessment identifier, evaluation type, and/or success/fail. Some embodiments provide that success/fail may be a binary value. When normalized, an outcome element may contain mircocompetency code(s) and relative educational value unit(s). The normalized element may ignore failed items and may only give credit for successful items.

The term "cumulative evaluation" refers to a parsed collection of many, typically all, summative evaluations to provide a balanced, if not complete, analysis of student performance in a program, curriculum and/or competency.

The term "cumulative analysis engine" refers to an electronic circuit that can electronically analyze student summative evaluation data inputs over time from at least one of the different educational evaluation environments, and typically three or more education evaluation environments (e.g., didactic, experiential, and discussion, among others) to generate a representation of the cohort performance relative to competency definitions.

Educational evaluation of performance may use formative and summative evaluations relative to a set of curriculum standards. Some embodiments provide that this can be done with basic scores on exams that are averaged to give a grade. In complex outcomes environments, simple grades may not provide enough information to correct specific deficiencies. The term "competency" has been used to give a more precise definition of skills and knowledge required to perform integrated tasks, such as those corresponding to medicine, engineering, and/or law, among others. Some embodiments may be particularly suitable for competency evaluation of students using normalized inputs associated with didactic grading, experiential grading and discussion environment grading. Some embodiments of the present invention can be used to assess effectiveness of complex curricula based on student competency scores. Any competency can be represented with a statement and/or definition and/or can be represented by multiple sub-components. As used herein, the sub-topics corresponding to competencies may be referred to as "microcompetencies" and will be detailed in later sections.

In some embodiments, the systems/methods are not configured to define objective differences between relative skills. The student encounters may be generally, and more typically, totally binary. As such, a didactic environment may be limited to reporting elements that are correctly answered (but may discard or give credit for known false-negatives). An experiential (e.g., clinical) environment may report skills that are successfully completed. A discussion environment may report posts that are made therein. These reports are defined as cognitive evaluations, meaning that relative quality of individual measures may not be used. Non-cognitive subjective values may be evaluated with other techniques.

In competency-based curricula there may be three different modalities for delivering instruction, and therefore, three different environments for evaluation. According to some embodiments, the three different environments for evaluation can be integrated into an extensible competencies electronic evaluation platform. The environments for evaluation may be the didactic modality, the experiential modality, and the discussion modality. Each will be detailed in separate sections of this document. Not all educational fields use all modalities for evaluation.

"Normalization" and the term "normalized" refer to a defined correlation standard for measuring different factors. For example, a point value assigned to individual tests or test questions, time spent in clinical or on experiential tasks, values assigned to critical thinking exercises and the like.

According to some embodiments, summative reports from many different environments may be digested when available. The results in the individual digested summative reports may be normalized into a common format. All of the summative reports may be combined into a common data set and a graphical representation of the data may be provided in a Cumulative Analysis Grid. Some embodiments provide that normalization may include defining relative value of points based on educational time spent, categorizing possible topics taught (microcompetency) and defining individuals, sub-cohorts of individuals, and cohorts of individuals that may be cumulatively evaluated.

The term "minimal time of relative value" (T) may refer to the basis unit for assigning credit for any outcomes event. T is the base time and can be further multiplied by other factors to assign event credit. The different inputs may be normalized using the minimal time of relative value (T). For example, a test question may have numeric output of "1" or "2" based on how long it is predicted that a typical student may need to evaluate and answer the question. The number can be assigned in time equivalents defined by a particular institution and/or based on a standard, such as a "1" for a 15 minute equivalent (thus a "2" can be associated with questions rated at a "30 minute" projected response time). If a student correctly answers the question, the answer receives the defined (normalized score). For experiences, like clinical practice of medicine or dentistry, the actual time that it takes to perform the task and the relative complexity of the task can be given a normalized value relative to 15 minutes. For example, the average time to extract a tooth may be 15 minutes, therefore, 1 value unit is given. This makes getting one question on a didactic exam equal to taking out a tooth in clinic, from a normalized basis. Similarly, for discussion-based environments, it is possible to give partial points for individual responses to problem-based learning discussions.

The term "relative educational value unit" (RVU) is an expression of possible credit for a skills assessment that is relative to time and complexity. For example, assuming that a didactic test item is equal to 1 RVU, then an experiential procedure or discussion experience may be mapped to additional time or complexity. A RVU can be expressed as equal to a basic time interval (T), multiplied by increments of T when more than one time interval is associated with a task or discussion. Additionally, the RVU may be adjusted for complexity: T×n (multiple of T)×C (complexity multiplier). The RVU may provide a relative value score associated with different educational factors, e.g., test scores, test answers, clinical or other experiential tasks or hours, discussion based problem solving skill scores and the like, normalized to a time unit (T). Thus, grading using RVUs is time-equivalent normalized and may be used for summative outcome evaluation of different categories of testing/evaluation.

The term "microcompetency codes" corresponds to microcompetencies and refers to a hierarchical expression of different topics that are possible for a student to experience during a competency-based educational curriculum. For example, a plurality of microcompetencies are associated with an overall competency for a particular curriculum. Not all codes are necessarily expressed in the curriculum, but the microcompetencies are a superset of what is possible to encounter. Additionally, although generally used herein in the plural form "microcompetencies", the singular form "microcompetency" is included therein.

The term "topic" refers to a defined educational concept, field or subject. The term "topic code" refers to an identifier that is correlated to a defined topic. The term "identifier" refers to a unique set of characters, typically numeric and/or alphanumeric characters. The identifier may be in a defined format for standardization across multiple electronic evaluation platforms. The microcompetencies are expressed as a defined hierarchical set of individual microcompetencies that correspond to a sub-topic of one or more defined topic codes. That is, one microcompetency may be associated with more than one topic code. A topic code typically includes a plurality of associated microcompetencies and may include between about 10-100 for some competency topics, although such range is not limiting. For example, some embodiments herein provide that more or less microcompetencies may be associated with different topics and different topics may have different numbers of microcompetencies. The microcompetencies may be provided with sufficient numbers to allow granular evaluation of a different sub-concepts within a particular topic. The microcompetencies may themselves be related to a plurality of sub-microcompetency codes. A particular educational assessment system may have several hundred topic codes and thousands of microcompetencies. The microcompetencies may be uniquely coded, for example, with a numerical code, but other code types may be used. The code may identify the relationship and/or position of a topic within the hierarchy. "Competency" may be defined as a combination of different microcompetency codes. Further, the same microcompetency may appear in multiple different competency evaluations.

The term "cohort" refers to a group of students who are being evaluated using the same identified components, elements or factors and/or the competencies and/or microcompetencies. Some examples of cohorts may include students grouped by a class, a professor, an associated institution (e.g., college or graduate school), and/or an assigned educational resource for a class (e.g., a metacoded book), among others. Additionally, the discussion modality may warrant another grouping factor that may be addressed by defining sub-cohorts. For example, subsets of students can be assigned to small groups for encountering discussions. Additionally, some embodiments provide that each individual in the cohort is also a member of their own sub-cohort. The details of this process are explained in the discussion modality section.

The term "didactic modality" refers to evaluation of student learning based on classroom lectures, textbooks and homework.

The term "question element" (QE) refers to a single didactic-modality question that includes a stem, one or more distractor answers, one correct answer or combination of choices, and that has a relative value equal to T. For example, a question element may include a simple exam question.

The term "question group" (qgroup) is an expression of a collection of individual didactic questions under a common microcompetency. The didactic-modality questions can be mapped to the microcompetencies at the point of creation and/or at the submission to the system as a testing event report.

The term "testing event" (TE) is a combination of question elements to create a formative evaluation of the cohort or a sub-cohort. Note that the didactic evaluation of sub-cohorts can lead to non-representative results in cumulative analysis.

The term "testing event report" (TER) expresses a cohort performance on a testing event.

The term "item analysis" involves mathematical evaluation of the TER to identify TEs that should be removed due to poor question construction or poor student performance. These tools may vary widely depending on the institution and/or testing mechanism. In some embodiments, the item analysis involves evaluating the individual relative to the cohort.

The term "didactic modality summative report" (DMSR) is a list of each individual's performance on each TE within the cohort after the item analysis have been accomplished and specific TEs have been eliminated from the TER.

The term "didactic modality normalized summative report" is a list of each individual's performance from the DMSR aggregated by RVUs by microcompetency. This report may be verified against the DMSR and then may be submitted to the cumulative data storage for analysis by the various analysis grids.

The term "experiential modality" refers to clinical and/or other "hands-on" type experiences related to a microcompetency code.

The term "procedure anchor code" (PAC) is the expression of coded procedures that can be competed for skills assessment in a clinical setting. In the case of health science they are the ICD-10 codes for medical procedures and CDT codes for dental procedures. In practice, some embodiments provide that the procedure anchor codes are represented and may be later mapped to a subset of microcompetencies.

The term "experience element" (EE) refers to an individual performing an actual skill-related task.

The term "experience group" (EGroup) is an expression of a collection of procedures/experiences under a common microcompetency. The experience modality procedures can be mapped to one or more microcompetencies at the point of creation and/or at the submission to the system as an experience event report. An "experience event report" (EER) expresses cohort performance on a testing event during a specific range of time and/or predefined time interval. For example, some embodiments provide that experience event reports may include daily reports from one or more other systems.

The term "experience modality normalized summative report" (EMSR) is a list of each individual's performance from the EMSR aggregated by RVUs by microcompetency. The PAC may be replaced with a microcompetency and its related RVU. This report may be verified against the EMSR and then submitted to the cumulative data storage for analysis by the various analysis grids.

The term "discussion modality" refers to a problem solving or discussion forum related to a microcompetency code where a student's ability to solve a defined problem and/or provide a detailed discussion of a defined discussion element demonstrating proficiency and/or comprehension and critical thinking is able to be given a grade. The discussion modality may be an online environment, a paper-based environment and/or may be a classroom environment. Some embodiments provide that the discussion modality is provided in an online format that accepts user responses and can be (interactively) monitored and/or assessed by a teacher, professor, teacher assistant, and/or other educational evaluator. To promote test integrity, a camera mode can be used and/or biometric inputs can be used to validate that the responder is the student. In other embodiments, a dedicated test site for the testing can be used and student identify can be validated upon access to the site.

An "individual discussion event" (IDE) is an individual making a comment in a discussion environment. There are many different types of IDEs and their value may be different for different types and/or content of comments.

As used herein, a "discussion sub-cohort" is a subset of the total cohort that facilitates the discussion educational experiences. In some embodiments, the entire cohort can be a discussion sub-cohort and/or an individual can be a discussion sub-cohort. Some example embodiments provide that a typical discussion sub-cohort is 5-10 individuals, however, such example is non-limiting in that sub-cohorts may be less than 5 or more than 10 individuals.

A "discussion sub-cohort summative report" (DSSR) expresses discussion sub-cohort performance on a discussion event during a specific range of time and/or time interval. In some embodiments, DSSRs may include a weekly reports from one or more other systems. A DSSR may be sent directly to the system for assignment of microcompetencies and RVU. Unlike the other two environments the topics discussed may be limited to tagging after they happen.

A "discussion sub-cohort normalized summative report" is a list of each individual's performance from the DSSR aggregated by RVUs by microcompetency. A decision may be made within this report as to the members of the sub-cohort who will receive credit for the discussions. The entire group can be given equal credit as a team, or the individuals can be given credit individually. The normalized data may be submitted to the cumulative data storage for analysis by the various analysis grids.

As used herein, the term "cumulative grid" (also referred to as the "grid") refers to a summary of competency related scores of (e.g., microcompetencies, groups of microcompetencies, and/or OEs) for one or more students. The grid can be color-coded to show degrees of competence such as whether a student meets defined threshold levels of competencies in different microcompetencies and/or sub-microcompetencies. The grid can be interactive and/or parseable to allow a user to access supporting data associated with the reported scores which can electronically organize the student data in various ways to analyze positive and negative trends associated with different classes, students and groups of students as well as common factors with different students.

The term "interactive grid" refers to a grid that includes elements that can be selected by a user (via a UI such as a GUI) to then electronically reveal underlying data supporting that element. Thus, when several students are identified as below minimum for a defined competency (e.g., a competency defined by one microcompetency, groups of microcompetencies, one or more sub-microcompetencies and/or groups of sub-microcompetencies for a topic), some embodiments disclosed herein may allow a user to access and/or interrogate (e.g., point and click on a block) the grid to identify individual ratings in various sub-competencies, as well as common factors, such as professor, school, class time, textbook, (clinical) experiences or tasks, and/or a location where the tasks were performed, among others. This cohort or associated data can allow educators or schools to adjust curriculums to address student needs where deficiencies are identified, for example.

The term "registered" means that the user is a recognized online participant of the system, typically using a password and login and/or authorized portal. The term "administrative user" refers to a user that does not have permission to access student records. Different types of administrative users can have different access levels to the system. Some participants/users may have access to cohort data correlated to student success, without any student identifiers. The term "web-based" means that the service uses at least one server to communicate with different users over one or more networks including, for example, the World Wide Web (e.g., the Internet), using, for example, the hypertext transfer protocol (HTTP), among others.

Embodiments or aspects of the present invention may be carried out using any social network service, typically a social network service that can provide suitable security or private (or semi-private) communications. The term "Yammer®" refers to an enterprise social network service that was launched in September 2008 by Yammer, Inc., San Francisco, Calif. Unlike Twitter®, which is known for broadcasting messages to the public, Yammer® is used for private communication within organizations or between organizational members and pre-designated groups, making it an example of enterprise social software. It is contemplated that other suitable enterprise social software/systems/services may be used to carry out aspects of the present invention.

Figure 2:
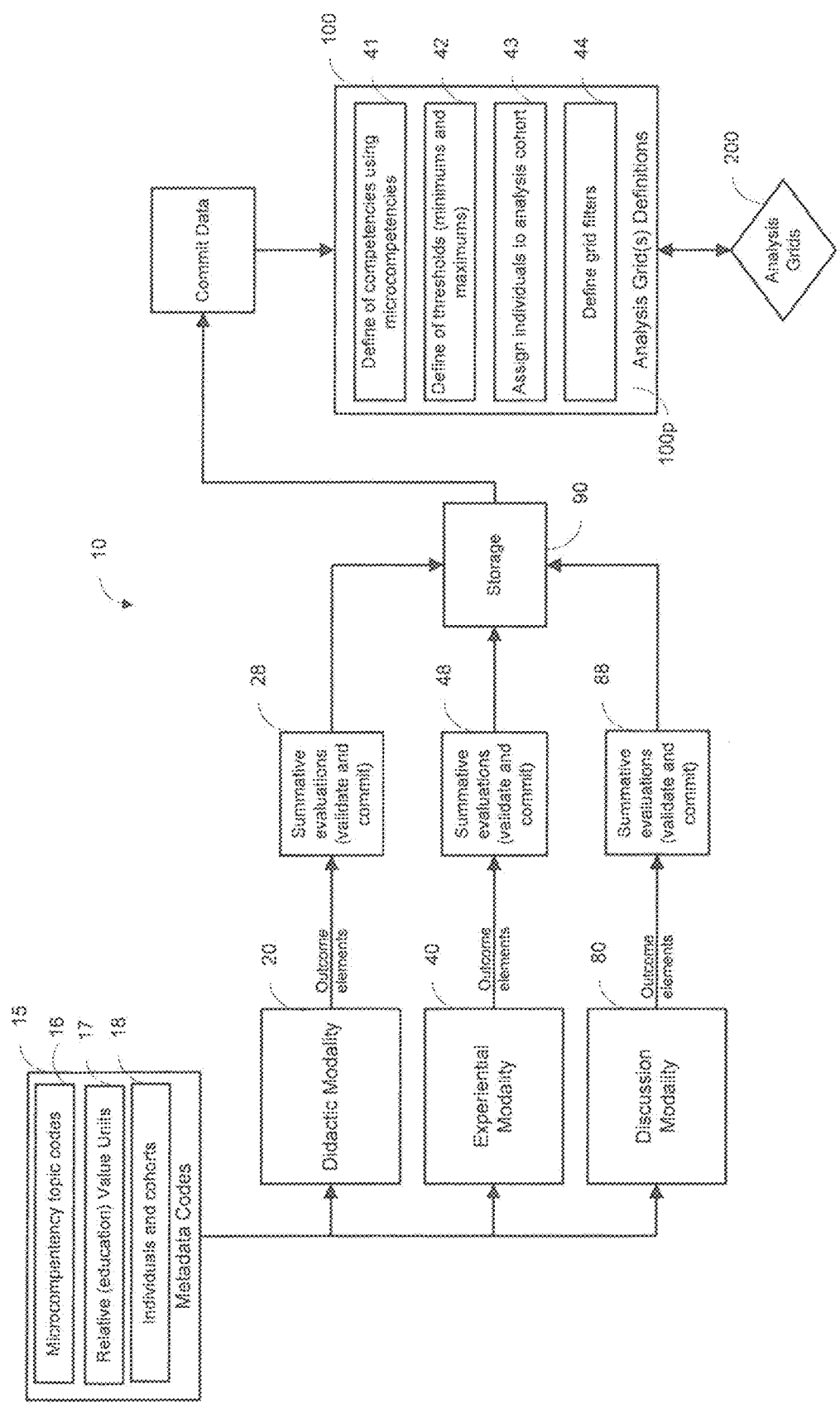
FIG. 2 is a schematic illustration system/method similar to that shown in FIG. 1 with an additional analysis platform according to some embodiments of the present invention.

As shown in FIGS. 1 and 2, embodiments of the invention include systems and methods of analysis 10 that include data from one, two or all three different environments: didactic modality 20, experiential modality 40 and discussion modality 80. Each modality 20, 40 and 80 is able to generate respective summative evaluations 28, 48, 88, which are associated with the metadata codes 15 including, microcompetencies topic codes 16, RVUs 17, individual (student specific) codes and cohort (e.g., class, professor, book, learning institution, etc.) codes 18. The data underlying each report and/or outcome element can be electronically stored for ease of future retrieval as evidence of performance and/or for curriculum or other evaluation.

Although not limited thereto, it is contemplated that some embodiments described herein may also be used in conjunction with a licensing system such as for state legal bar examinations for lawyers, and/or licensure examinations for doctors or veterinarians, among others.

It is also contemplated that some embodiments disclosed herein can evaluate cumulative outcome data with its rich underlying cohort data to provide feedback to educational institutions, book publishers, and the like based on pass rates, topic specific achievements for various microcompetencies, and the like over multiple students and in multiple states. This data analysis can allow such institutions, or other organizations to rank schools, rank professors and/or classes, evaluate text books (noting those that provide the best student outcomes for a particular topic and/or those that produce poor results), reward best-outcome educators for one or more topics, and/or make other changes to a class or curriculum based on such cohort data and cognitive outcome results.

It is also contemplated that the systems/methods can be used to evaluate continuation education CLE evaluation may only evaluate one or a sub-set of the three environments. First, the didactic environment provides for a direct delivery of content and a relatively simple assessment using questions and answers. Second, the clinical environment provides for the performance of skills and a relatively simple assessment of skill performance. Third, the discussion environment provides for delivery of stated scenarios that require research and synthesis and a relatively complex assessment of problem-solving behaviors and skills.

Didactic Modality

Still referring to FIG. 1, the didactic modality 20 can include outcome elements 28 that are based on individual testing elements (block 21) that are electronically (pre) tagged with an associated microcompetency and RVU (block 22), then grouped into examinations for respective individual testing element summative evaluation (block 23). The grouping can group sets of individual testing elements 21 with scores (normalized using RVUs) (block 23) for summative evaluations×N (block 24). Thus, the student encounter with the examinations may be filtered through extensible outcome element item analysis as a binary evaluation (block 25), with post-item analysis summary report (block 26) before being submitted and/or used for outcome element summative grading 28 and data storage 90, and electronic cumulative analysis 100.

Didactic modality 20 may provide summative evaluations 28 based on individual test elements that are electronically pre-tagged with one or more associated microcompetencies and a corresponding RVU. Stated differently, exam questions are associated with topics and points, then collected into an exam for students to test their knowledge.

For many educational environments, individuals are evaluated for knowledge based on simple questions with single correct responses. These questions are typically given in collections as tests and exams. Performance may be based on relative percentage of correct responses. Thresholds for summative analysis may be relatively simple. Examples of associated steps for this evaluation are described below:

Step 1. Question stems are associated with responses, which are tagged as correct or as distractors. These are question elements. Each question element is associated with a unique identifier. Each question element is given a RVU of 1. The assumption is that the amount of time that it takes to understand material to get the correct answer on one item is equal to the minimal time of relative value (T). An explanation of the correct answer may be provided for later use. Some embodiments provide that the stem can include images.

In some embodiments, question stems are associated with responses, which are tagged as correct or as distractors. These are question elements. Each question element may be associated with a unique identifier.

Step 2. Question elements are tagged with one or more microcompetency codes (microcompetencies). This can be accomplished in two ways. In some embodiments, each question element may include metatags where a code can be associated. In some embodiments, question groups (QGroups) are generated and then question elements are placed under the appropriate QGroup.

Step 3. Question elements are sequenced into testing events. Each testing event may be associated with a summative analysis code. In most cases this may be related to a course. A testing event may include question elements that are associated with one or more microcompetencies and a RVU. Therefore, formative reports can be generated to associate individual performance relative to a pass/fail threshold, relative to the other individuals in a cohort, and/or by subject matter.

Using a learning management system, the cohort of individuals encounters the testing event and data concerning the individual achievement on each question element is recorded. A non-adjusted testing event report may be generated.

Step 5. After all individuals have completed the testing event, each item may be analyzed for quality of the item. The effect of the cohort may be important at this juncture in the process. Every student must encounter the summative evaluation so a post evaluation item analysis can be performed on the raw results. In some embodiments, an institution may decide not to perform item analysis to generate a normalized summative report, but it is preferable to exclude poorly written questions or questions where the cohort guessed.

It is noted that item analysis may include many statistics that can provide useful information for improving the quality and accuracy of multiple-choice or true/false items (questions). Some of these statistics include item difficulty, which may be determined as the percentage of students that correctly answered the item. This process can be performed within the learning management system and/or through operations and methods disclosed herein. One function of the item analysis is to remove poorly constructed questions or questions where the entire cohort performed poorly. An institution can devise multiple methods for this process. This disclosure does not provide the specific mechanism of item analysis, but it provides that this operation be performed before a summative report is sent for analysis.

Step 6. Based on question element item analysis, individual question elements may be eliminated from reporting. In some embodiments, items may be deleted one item at a time, because a higher exam reliability coefficient may be provided if a question element is deleted, and the item-total statistics report is re-run to ensure we do not lower the overall alpha of the exam.

Step 7. Following exclusion of flawed question elements, a didactic modality summative report may be generated to give the individual their adjusted score (% correct), the class average, the individual class rank, and/or an explanation of the items missed, among others. The institution may choose to average these reports over courses to give traditional grades. That process is not unique and is not in detail herein.

Alternative Step 7. As an alternative to the above-described operation, following the exclusion of flawed question elements, a didactic modality summative report may be generated to give the individual their adjusted score (% correct), the class average, the individual class rank, and/or an explanation of the items missed, among others. Question elements may be tagged with one or more microcompetency codes (micro competencies).

Step 8. A didactic modality normalized summative report may be created. This data may be verified by the testing specialist as being complete and may be sent to a cumulative analysis engine (electronic circuit and database(s)). In this manner, the RVUs associated with individual questions may be replaced with an aggregation of RVUs by microcompetency per individual for submission to the cumulative analysis grid.

Step 9. The didactic modality normalized summative report may be verified against the summative evaluation report to make sure that the individual is receiving the same number of points relative to the cohort. This may be important to the process. If the overall goal of the process is to see where an individual student is strong or weak relative to topics, different students in the same cohort can score the same percentage of points, but have done well or poorly in different microcompetency areas. This verification step assures that the same number of points are transferred during the normalization process.

Step 10. The verified normalized summative report may be submitted to the cumulative analysis grid and it may be verified that the student received the appropriate number of points to the appropriate competency.

Step 11. The verified normalized summative report may be archived as "committed" for audit purposes.

Experiential Modality

Still referring to FIGS. 1 and 2, experiential modality 40 may also be associated with metadata codes 15 for outcome elements. The experiential modality 40 can employ outcome elements that are formulated using (pre)tagged specific skills (e.g., "Individual Experience Element" or "IEE"). The individual experience elements (block 41) are electronically associated with a respective microcompetencies 16, groups of microcompetencies and/or sub-microcompetencies and RVUs 17 (block 42). Each student can encounter one or more individual experience elements (skills) 41 at different times and the number of events (N) (block 43) can vary from student to student. Proficiency in a skill provides the binary decision (block 44) used by a post-event summative report 45 to submit the outcome element 48 for cumulative analysis 100 and/or an electronic competencies assessment platform 100p.

Placing a topic metatag (like microcompetency code) to a specific course component allows an institution to visualize where certain topics are taught over the delivery schedule of the curriculum. From a practical view, time units may be mapped in increments of 15 minutes, however, the disclosure is not so limited. The didactic environment is the most predictable and is the closest to standardization. For example, 15 minutes of lecture or presentation laboratory experience (cadaver lab, histology lab) is 15 minutes regardless of the subject matter. Therefore, it is substantially knowable and quantifiable for most faculty to agree upon the definition in order to report.

For experiential modality 40, microcompetency codes can be pre-defined with respect to various actions, seminars, participation or viewing events and procedures associated with an experiential environment of a particular educational curriculum (e.g., clinical, surgical or laboratory system for health sciences and practicals for observation or teaching in schools for a teacher curriculum). On a defined temporal basis, e.g., daily, weekly or the like, an electronic report can be generated (e.g., in a CSV format) which identifies student, RVUs, provider identification code and the respective microcompetencies. These reports can be generated daily and can accumulate over the academic life (and beyond) of each student. The data is provided with a convention for student identifiers (or a translator for allowing data input), and the system can be automated to create, evaluate and submit each report to a grid data repository and analysis circuit.

In health science, the performance in actual clinical procedures is important to properly evaluate individual performance. The individuals record these events in electronic patient record systems. Every procedure is tagged with an existing Procedure Anchor Code (PAC), which is usually associated with the financial remuneration for the successful performance of the task. In medicine, these are the ICD-10 codes. In dentistry, these are the CDT codes. Examples of individual experience element evaluation steps are described below.

Step 1. Match each PAC with an appropriate microcompetency code. All assessment reports will substitute the microcompetencies for the PAC.

Step 2. Each procedure that is represented by a PAC is evaluated for RVU. As noted above, the RVU measures the relative educational value for each procedure. To normalize the outcomes assessment for experiential (clinical) and discussion-based educational environments, the RVU may be based on three components. The first component is time, which may be the physical time that it takes to perform a clinical task. In embodiments in which the normalized value of one exam question is 15 minutes of educational investment, 15 minutes is equal to 1 RVU. The second component is laboratory time as many dental procedures involve laboratory time for students. The amount of time that a student will perform laboratory tasks that are separate from clinical contact with the patient may be estimated. The third component is higher expertise. For example, some procedures, like complex oral surgery, will involve a higher level of interest by the student or a higher level of specialty instruction to perform in a pre-doctoral setting. Some embodiments provide that a multiplier of 3 may be used, although the multiplier may be a value other than 3 in other embodiments. Some codes are "observational" in that students would not actually perform the procedure and therefore only get credit for being involved.

In the experiential (e.g., dental clinical) examples that follow, a list of CDT codes was presented to a group of faculty members for their estimate of an RVU for each code. "T" was previously defined as equaling 15 minutes, so 15 minutes is equal to "1 unit". The following formula was used:

$$RVU=(\text{clinic time}+\text{lab time})\times \text{complexity multiplier.} \quad \text{(Equation 1)}$$

For each institution, there is a core list of CDT codes that apply to all dentistry and there are certain procedures that are unique to that educational environment. For example, every "house code" has an assigned RVU. Certain laboratory skills are taught in preclinical courses and can be given PACs as derivative CDT codes. In this manner, the institution may use the clinical system to track laboratory outcomes. Examples of clinical experiences with assigned RVUs and associated MC are:

PAC-D0421-Genetic test-oral diseases-36.00 Based on 2 hours of clinical time (12 RVU), 1 hour of laboratory time, with HE Multiplier.
MC-01.02.09.01 Genetic Testing PAC-D7287-Cytology sample collection-2.00 Based on 30 minutes of clinical time.
MC-01.08.01.08-Bacterial Cultivation PAC-D1310-Nutritional counseling-8.00 Based on 1 hour of clinical time, 1 hour of laboratory time.
MC-01.07.02.05-Nutritional Assessment Step 3. Each day in the experiential curriculum, an individual may perform procedures. A successful attempt may be given credit by an appropriate authority. In some embodiments, all individuals in the cohort perform procedures as part of daily curriculum events. This is called a experience event report.

Step 4. An experience modality normalized summative report is generated from the experiential platform to give the individual production of procedures and RVUs for each of the associated microcompetencies. An experience modality normalized summative report is created in a similar fashion to the didactic environment. This data is verified by the outcomes specialist as being complete and is sent to a cumulative analysis engine. Some embodiments provide that the process replaces the RVUs associated with individual procedures with an aggregation of RVUs by microcompetency per individual for submission to the cumulative analysis grid.

Step 5. The experience modality normalized summative report is verified against the experience event report to make sure that the individual is receiving the same number of points relative to the cohort. In this manner, areas of an individual student's strength and/or weaknesses relative to topics may be determined even if different students in the same cohort can score the same percentage of points. The areas of strength and/or weakness may be identified by determining that a student has done well or poorly in different microcompetency areas. This verification step assures that the same number of points may be transferred during the normalization process.

Step 6. The verified experience modality normalized summative report is submitted to the cumulative analysis grid and it may be verified that the student received the appropriate number of points to the appropriate competency.

Step 7. The verified experience modality normalized summative report is archived as "committed" for audit purposes.

Discussion Modality

Still referring to FIGS. 1 and 2, the discussion modality 80 can electronically tag student discussions (e.g., text or multi-media) posts with microcompetencies 16 and RVUs 17 after the student (or other test-subject) encounter (block 84). In some embodiments, the discussion subject can be associated with a defined (pre-tagged) microcompetencies 16, but the RVU may be typically generated after the fact, based on student knowledge, responses and/or proficiency. The individual discussion elements (IDE) can be defined (block 81). For example, as discussed below in more detail in reference to FIG. 4, a discussion event input screen may be provided for identifying, providing and/or defining the individual discussion element. The IDEs can be grouped into summative discussions (block 82). Some embodiments provide that the discussion modality 80 can be an interactive electronic (e.g., online) environment forum that a student or other test subject can respond to a given problem, question or other prompt.

In complex educational environments, the ability to solve problems from practical discussion of cases or problems may be difficult to evaluate and track. Accreditation bodies may place a great deal of value on the ability to apply knowledge. Since the discussion itself can cross multiple topics and can involve different levels of complexity, the discussion events may be typically tagged for educational value separate from the event itself.

While embodiments disclosed herein contemplate that text based postings will be a viable means of providing a discussion forum, it is also contemplated that online multimedia communications may also be used for a discussion modality 80. Combinations of these types of discussion formats can also be used. Some embodiments provide that video streams of the multi-media video may be electronically stored with a summary of evaluation for cumulative analysis. Services related to online multimedia communications may be provided by a third-party online multimedia communications service provider, which may be, e.g., a consumer videoconferencing service provider such as Skype, Microsoft Live Messenger, Yahoo! Messenger, America Online Instant Messenger, and/or Apple iChat, among others.

In some embodiments, the discussion modality 80 can be carried out using and/or including a threaded discussion logged by student with time posting. The discussion posts can augment basic blog technology with a RSS (Really Simple Syndication) client. RSS allows for subscription, management and posting of content to secure blog systems. In this manner, the user may make postings to the blog without launching a browser. Current RSS clients are useful models for binary applications in order to give rise to properly engineered applications specifically engineered to meet the complex needs of case-based education.

However, computer applications for writing, managing, and participating in cases can be written that may be more suitable for larger schools/practitioner implementation. Using the case application suite, an implementation (onboarding into a central system or use in discrete standalone systems) with multiple schools, practices, and programs can be facilitated.

Some embodiments of the invention seek to provide participating educators with an implementation strategy for case-based education that can actually be scaled to fulfill the educational mission to teach critical thinking and problem solving. From an educational philosophy standpoint, educators may disagree concerning the number of cases, the depth of cases, the role of the instructor, and the outcomes assessment of individual implementations. From a technology standpoint, the systems can be powerful enough to facilitate the educational mission while simple enough to encourage use.

For a discussion modality 80, it may be desired to include cases that provide fact patterns that are authentic, promote realism and yield intense learning experiences that the practitioners and/or educators can relate to students. Beyond recruiting "non-traditional" cases, the technology for writing the case components, attaching related content, and creating learning objectives may be consistent. Faculty resources may limit the time within the schools to reformat each practitioner case, and the alternative is to limit the number of practitioner submissions. For some disciplines (e.g., dental and medical), to adequately assess competency, it is believed that there should be hundreds, if not thousands, of discussion cases available to students. The preferred case writing application should provide simple processing tools for creating the components, for reediting components, and then should package the resultant case so the components cannot be altered.

Managing cases may be a different experience from writing. Each school can have a different role for cases. Each school can have different theories for student and faculty grouping. Each school can also have differing views for outcomes measurement. In some embodiments, the systems and methods disclosed herein can be configured to accept a case package from a case-writing tool and allow the course director to assign students and faculty, to determine posting times and resolution dates, and/or to design appropriate grading criteria, among others. As a practical matter, this application environment would adapt individual cases to meet larger curriculum goals. Participating in cases should be relatively simple. Once the management application assigns a case to a student or faculty, the participation tool for the discussion environment should: alert the user to the assignment; "push" the postings to the client through simple subscription; allow for direct posting; and monitor time components and grading issues.

It is believed that there will be many users of the participation tool, fewer users of a case writing tool, and very few users of the case management tool. Practitioners may propose or submit cases that other practitioners could take for CE credit. Students may write cases for other students. Issues that currently restrict school and program use of cases, such as number of cases, and number of faculty, could be reduced, if not eliminated.

In some embodiments, evaluating performance corresponding to the discussion modality 80 may include exemplary operations as provided in the following steps.

Step 1. A discussion group is created with one or more individuals. This group will all receive the same credit as each individual. The individuals participate in a collective. The cohort can be, and usually is divided into sub-cohorts to facilitate discussion. In the current implementation, the typical sub-cohort has 5-10 students. The discussion sub-cohort summative report can be generated (block 83). The individual discussion element 81 can be meta-tagged with metadata codes including microcompetencies 16 and RVUs 17 (block 84). For example, typically, at least the RVU is defined and tagged (subjective with guidelines) by a grader. The microcompetencies may also be applied at that time, but may also be generated earlier based on defined topics rather than "stream of thought" type discussion. The definition of outcomes cohort can, be generated (block 85) as well as a post-element analysis summative report (block 86). The outcome elements for summative evaluations 88 can be submitted to the cumulative outcome storage data collection 100.

Step 2. A discussion may be initiated with a question or prompt. Within that thread, individuals may respond to the prompt and to the participation of others in the group.

Step 3. An individual discussion event may include a unique item identifier, a unique thread identifier, a time stamp of the posting (including date and time), a unique user identifier, and/or the body of the posting, among others.

Step 4. A discussion may be limited by time. Based on the time stamps of the discussions all of the IDEs within a proper reporting interval, a discussion sub-cohort summative report may be generated for assessment. The discussion sub-cohort summative report may be verified and sent for formatting by the discussion evaluation tool. This process may present the discussion for third party evaluation.

The discussion sub-cohort summative report may be submitted for "grading" which will attach corresponding microcompetencies and RVUs to each post. An evaluator, grader, host, other prompt and/or other students can interact with the test student(s) to assess depth of knowledge, problem solving skills and the like. The RVU may be partially based on subjective criteria and partially based on objective criteria (e.g., keywords, length of text, discussion time, and the like). The system can accept a post-discussion summative report that attaches a summary of grading of the discussion with the discussion text itself for future retrieval. The subjective weighting may be provided by the interactive person "grading" the student/test taker, or groups of students, and is typically within a predefined range of based on time increments of 15 minutes and difficulty. In some embodiments, a simple post may be worth at least 0.1 RVUs.

Brief reference is now made to FIG. 3, which is a screen shot 80s of a user interface in which a post is being graded. The screen shot 80s includes a table-format summary of: Post Author by name (or student identifier), a Type of input (e.g., Student Post Content, Student Post Logistics, Student Post Other, or if Faculty Advisor, Faculty Post Case, Faculty Guidance or Faculty Other), microcompetencies corresponding to each post content and logistics, etc. with associated RVUs and Comments. A Student summary window 80w may include a summary of numbers of posts and total RVUs for each student and overall for the IDE. An evaluator "submit" input may be used to submit the data to an evaluation circuit once the IDE is complete with RVUs and microcompetencies.

Figure 5:
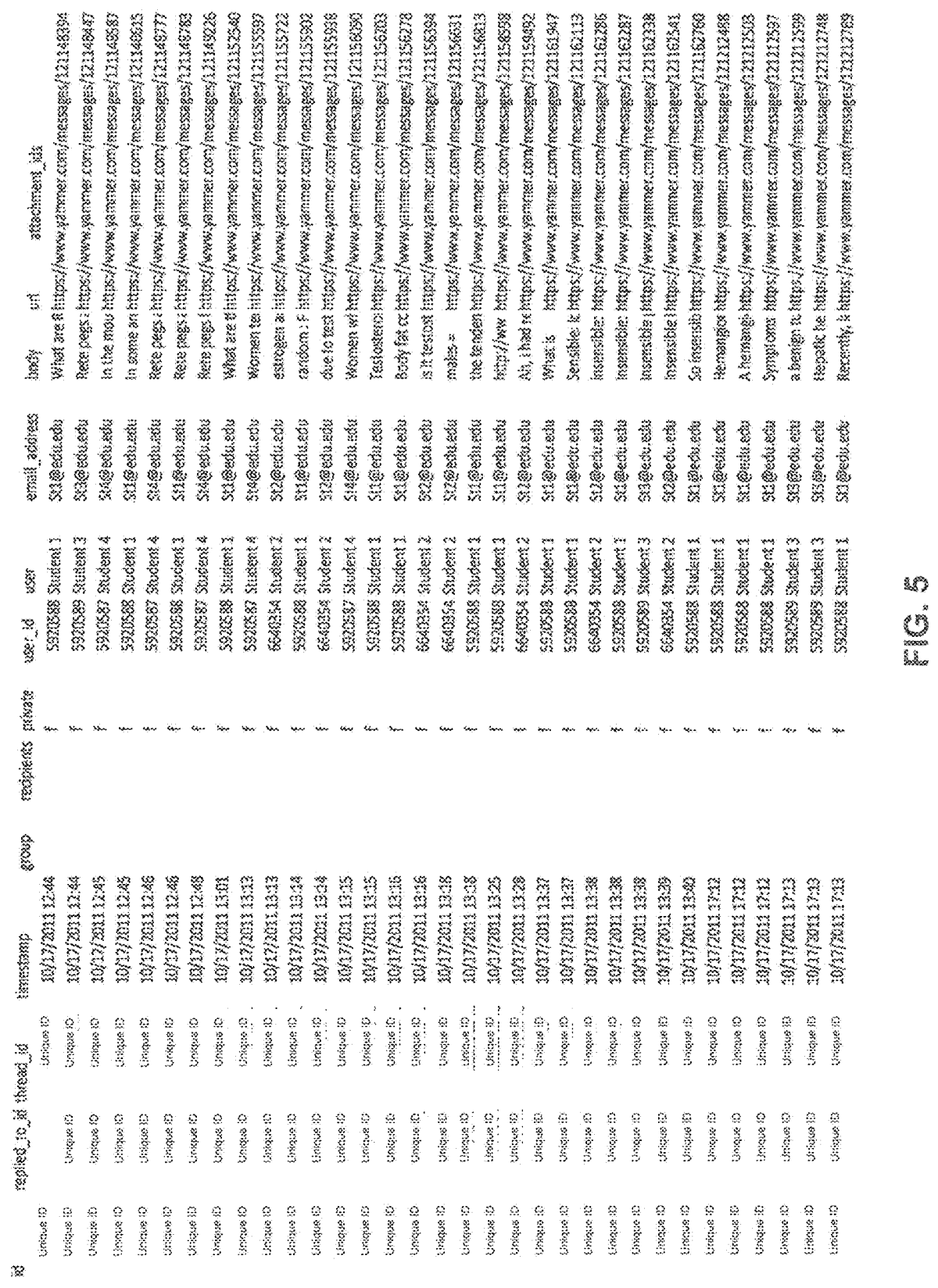

Brief reference is now made to FIG. 5, which is an example of a CSV file from a Yammer® discussion. The evaluation and tagging of discussion content can be facilitated by a dynamic survey. It is contemplated that a report (e.g., generated from Yammer®, for example) can be used to create a dynamic "survey" using a defined survey tool, for a faculty member or other defined person to grade the discussion events. As noted above, the report can provide a word count for the body of the post.

Reference is now made to FIG. 4, which illustrates a screen shot 80m of a user interface that may be used for the discussion modality 80 to allow an evaluator to electronically assign microcompetencies and associated RVUs for an IDE 81 (FIG. 1) for a student and posting type. A word count may be generated and displayed. For example, as illustrated the word count is 75/100. A progress to completion of topic (potentially with a time remaining reminder) input and a comment input section may be included. User inputs such as "Next" and/or "Submit" may be provided for the evaluator or other user to proceed to a next step or to submit the data. An "Overview" user input may provided for a user to toggle to an Overview screen. After all posts have been graded, a discussion sub-cohort normalized summative report may be generated. All of the microcompetency codes may be verified as valid, but there is no raw data to verify against.

The sub-cohort information may be very useful at this juncture. Each sub-cohort of the cohort provides multiple opportunities for RVU point assignment. Unlike the didactic environment, each sub-cohort has unique discussions and posts. The decision may be made by the outcomes specialist to give each individual their own grade based on their personal posts, and/or to give all sub-cohort participants credit for everyone's participation. This is a choice that may be made based on the discussion environment and the curriculum needs. At the end of all of the posts (text or multi-media), there can be a place for a "group grade" of pass/no pass. There can also be a place for an individual grade of pass/no pass beside the name of the student/user.

The verified discussion sub-cohort normalized summative report may be submitted to the cumulative analysis grid and verified that the student received the appropriate number of points to the appropriate competency. The verified discussion sub-cohort normalized summative report may then be archived as "committed" for audit purposes.

For each post, the grader can evaluate one more of the following:
(1) Posting Type: From a pull-down there are a number of possibilities, shown below as six possible choices:
"Faculty Post Case"
"Faculty Post Guidance"
"Faculty Post Other"
"Student Post Content"
"Student Post Logistics"
"Student Post Other"
(2) Microcompetency Code(s): The input can include a plurality of fields, e.g., 3 fields, where microcompetencies associated with the post can be entered (a user must then elect the 3 closest microcompetencies, the system may provide a keyword search of the post and suggest microcompetencyies that may be appropriate).
(3) Relative Value Units: This input is typically limited by a range of 0-10, such as, for example, a field limitation which may be implemented or selected by a user via a Pulldown with numbers, e.g., 1 to 5.
(4) Comment: A field that assumes no comment, but where a message/paragraph can be entered.

Cumulative Outcomes Storage

In some embodiments, the system 10 can be configured so that common naming and coding of students is used in all modalities and/or environments and/or that appropriate translators are used to import and/or exchange data between the various systems and/or the cumulative analysis engine.

Where all three environments are used (modalities 20, 40, 80), all verified normalized summative reports (with outcome elements) from all modalities 28, 48, 88 can be submitted to at least one data repository 90 (e.g., archived student education history server). Typically, the reports (e.g., outcome elements) may be provided as they are generated or completed, but may also be provided on a time-based input (upload or other data transfer).

Each of the outcome elements that is stored in the common data repository may include the following fields:
Unique Element ID
Unique Program ID
Unique Student ID
Date
Didactic, Clinical, Discussion
Primary, Remediation
Microcompetency
RVU The fields do not have to be in a specific order, provided that the source file can map to these elemental fields.

Analysis Grids

Figure 6:
FIG. 6 is a partial screen shot of an exemplary interactive (color-coded) evaluation grid according to some embodiments of the present invention.

A cumulative analysis module 100 (FIGS. 1, 2) can be configured to analyze data from one, two or all the environments corresponding to modalities 20, 40, 80 for a respective student over time or at a particular desired time. Thus, as shown in FIG. 6, the systems/methods can generate a cumulative evaluation grid 200 also known as a cumulative analysis or competencies grid. The cumulative analysis module 100 can be housed in one server or host or may be distributed. Additionally, the cumulative analysis module 100 and/or the data repository 90 may be provided using distributed computing resources, such as, for example, cloud-based data storage and/or processing.

Data cross-section is a basic expression of difficult data. The data from educational outcomes may be specifically difficult to express. Advantages from methods and systems disclosed herein may be realized based on the concept of competence itself. A "competency" or "competency statement" is a synthetic aggregation of related skills or topics. Competencies are extensible by definition. Any program defines these extensible concepts based on their own concepts and approaches. The grid 200 is the expression of the data from all of the sources in methods that show individual student data relative to all students in the cohort and relative to the relevant topics that represent competence for the cohort.

Education may be difficult and complex. Every student enters a new educational experience with previous knowledge and different abilities. Every program within a discipline tries to provide experiences that are engineered to train a student to become capable of being a member of a specific workforce. That could be a chemist, an author, a dentist, an engineer, or any of another myriad specialties.

Educational programs present the students with a series of experiences, called curriculum, and evaluate performance with many different metrics. Systems and methods disclosed herein create a way to "normalize" the various outputs of curriculum evaluation to simplify the visual presentation of this data.

In the previous discussion, the systems/methods for the creation of the grid data expression is addressed. In this section, the data is manipulated to better graphically represent the results for educational decision-making.

At the cross-section of the student and the competency is the "grid cell". Each grid cell 201 is unique to that grid and that cohort. Depending on the data allowed, the grid cell 201 calculates that students' performance for the respective microcompetencies defined for that competency. The sum of all of the points and partial points are represented in one number that may be expressed to, for example, the tenths decimal place. Two separate events may be calculated based on the individual grid cell 201. First, the total student performance may be calculated for each student in the cohort. Second, the student data for a specific competency may be analyzed for various rankings. The details for each grid cell 201 can be attained currently with a combination of specific keys.

A grid cell 201 that detects no data for display may be represented with 0 and with specifically colored background to denote a lack of data. For example, some embodiments provide that a grey background may denote a lack of data. Showing no data within a grid cell 201 is not unusual in the early parts of a curriculum, however a hole in the latter stages of training may show a curricular deficiency.

In some embodiments, the sum of all grid cells 201 may be summed in a number to a defined degree of accuracy, e.g., as shown to the tenths decimal place in a separate column. The rows may be auto-sorted from greatest number to lowest number with a result of ranking the students within the cohort. With the addition of new content the rows may auto-sort and result in new rankings.

The grid cells 201 may then be evaluated vertically for each competency. Some embodiments provide that the data from all of the grid cells 201 may be mathematically sorted into three to seven standard deviations. Some embodiments provide that the data is sorted into five standard deviations. The highest standard deviation values may be represented with a gold background to the related grid cell 201. The lowest standard deviation may be represented with a red background to the related grid cell 201. The second, third and forth standard deviations may be represented by shades of green, for example, from lightest to darkest, respectively. The result is a graphic display that allows the administrator to see how students rank based on the specific topics within a grid 200. Additionally, the areas of specific weakness for a student "lights up" in red and areas of specific strength are shown in gold. This allows the program to target remediation of specific weakness and recognition of specific strengths. The colors disclosed herein are by way on non-limiting example in that other colors may be used within the scope and spirit of the present invention.

Two additional features can alter the standard deviation color-coding. These may be referred to as a "hard floor" and a "glass ceiling". The administrator can place number values in the grid 200 to represent a minimal value that is required to be competent. This "hard floor" will set a value below which the number will be represented as red, regardless of the standard deviations. This may serve to set minimal standards for numbers of procedures that must be accomplished. The glass ceiling manual designation is a number above which all grid cells 201 will be designated as gold. This "glass ceiling" allows the administrator to determine a threshold that represents excellence, regardless of the standard deviations. In this manner, students can go above this number and the entire cohort can gain this level of excellence.

In some embodiments, the high (gold) cutoff and low (red) cutoff may default to the standard deviations unless specifically entered by the administrator. The grid 200 may automatically calculate a Student High, a Student Low and an Average for each Microcompetency column.

The grid 200 can be of a single topic with multiple associated microcompetencies or based on other topics or classifiers of interest. Each cell 201 of the grid represents an intersection of the student and their performance (RVUs) filtered by the specifically included microcompetencies and by the included environments. No value can be represented in a grid cell 201 as equal to zero RVUs or can be left blank. For statistical purposes a blank value may be equal to zero RVUs. Some embodiments provide that the rows of cells may represent respective students in the cohort and the columns of cells may represent the respective microcompetencies, however, such arrangement is non-limiting.

The grid 200 may change with the frequency that inputs are provided. For example, some embodiments provide that the grid 200 may automatically update daily if inputs are provided daily. For example, daily reports from experiential environments will provide points associated with microcompetencies that will accumulate over time to the grid. The same microcompetencies can show up in multiple areas. Similarly, for didactic inputs, exam reports may provide normalized points from the didactic exams and can be provided for cumulative analysis. For both the didactic and experiential inputs, some embodiments provide that an AXIUM® project management software may be used, Axium XTS, Inc. Oregon, USA. It is believed that AXIUM® has an extensible metatag called "category" that can be adapted for the microcompetency code to avoid the use of a translator, which may reduce potential implementation errors.

The grid 200 can be interactive as noted above. The grid 200 can presented on a display with a UI (User Interface) such as a GUI (Graphic User Interface) that allows a user to select a student to reveal more data associated with the student, to select microcompetencies to electronically automatically reveal various sub-topics and associated scores. In this manner, a user can analyze trends with the student data, e.g., search for common factors for students failing, for students in honors ranges and the like. Thus, for example, if a number of more students that are identified as failing are in the same class, perhaps that is an indication that there is a problem with the class.

The interactive grid 200 can be configured to allow users to click and drag the table to navigate and ctrl-click, select and/or touch (contact or touch gesture) a cell 201 for cell-specific information. For example, student ID numbers and competency score cells can be clicked to show data points used to create the selected cell's content.

A user can drill down to show groups of students for different criterion, i.e. year in program, gender, and the like. The grid 200 can include cell information pop-up comments and the information accessible and/or shown when a user select (e.g., ctrl-clicks) a cell can be defined by the type of user accessing the grid.

The cumulative data in the evaluation may identify other common factors to allow for pro-active adjustments in the curriculum, educational resources and/or for the student.

In some embodiments of the grid 200, the didactic environment summative grading inputs may have a much smaller weighting of relevance in the cumulative evaluation than either of the experiential or discussion environment grading inputs. For example, about 10% of an overall cognitive assessment score for a particular microcompetencies can be based on didactic summative grading, compared to about 40-60% for experiential and 30-50% for discussion summative grading.

The grid 200 allows extensible definition of "competencies" as subsets of microcompetencies. As data accumulates to the data repository, the grid can dynamically calculate performance from all three environments. As noted above, minimal thresholds and performance rewards can be tagged.

As briefly discussed above, the elements of mapping using common topic logic, called microcompetencies, may provide a hierarchical numbering label for topics. In some embodiments, there are 4 levels of this hierarchy separated by legal numbering periods. Examples are as follows:
  02-Designates Body System
  02.08-Designates Gastrointestinal System 02.08.07-Designates Clinical Dentistry
02.08.07.13-Designates Resin Restorations
01-Designates Pan-systemic Disciplines
01.06-Designates Human Immunology
01.06.08-Designates Immunizations
01.06.08.01-Designates Vaccines Some embodiments provide that not all topics have 4-level detail. For example, some outcomes may adequately test the 3rd level as a group. In the numbering scheme, a 00 may be added in the fourth level of the code.

Different educators within a curricular program may have different student evaluation needs, therefore different views of the total body of outcomes are needed. A "competency grid" may define related topics for simultaneous viewing. For instance, there may be a need to see how the students perform in human anatomy. A grid can be created to represent all of the anatomic microcompetencies. The data may be parsed by anatomy by system. In this example, anatomy is the basis of the grid, each system represents an extensible competency, and the microcompetencies for the anatomy of that system defines the student performance that will be represented in the grid cell 201 of the grid 200.

For the purpose of the grid 200, the definition of each competency may be a simple list of the codes that the administrator considers to define what needs to be displayed. An example for the anatomy of the cardiovascular system follows:

CVAS-Normal Development and Structures
2.06.01.00
2.06.01.01
2.06.01.02
2.06.01.03
2.06.02.00
2.06.02.01
2.06.02.02
2.06.02.03
2.06.02.04
2.06.03.00
2.06.03.01
2.06.03.02
2.06.03.03
2.06.03.04
2.06.03.05
2.06.03.06
2.06.03.07
2.06.03.08
2.06.03.09
2.06.03.10
2.06.03.11
2.06.03.12
2.06.03.13
2.06.03.14
2.06.03.15

Once the codes are defined, the second factor that filters the expression within a grid cell 201 is the data source. As described previously, there is data from the discussion environment, didactic environment and the clinical environment. Any grid 200 can display the data in a grid cell 201 from the designated microcompetencies from any one or combination of data sources. A grid can be made to show all data or just the data from didactic exams.

In practice, some students are better on exams than they are in clinic. This will show in the expression of filtered grids 200. As described above, different administrators and educational stakeholders may need different reports from the curriculum. The creation of specific grids allows these customized views.

Similar to data source filtering is the inclusion of remediation elements. Each data source element may also be designated as primary or remediation. Primary data may represent outcome elements that every student experiences. Remediation data may represent outcome elements that are targeted to re-test certain students for specific deficiencies. In this manner, the administrator may create grids that only use primary for an evaluation of the entire cohort. This allows specific grids to be made to show additional work that is given to certain students. This provides that the grids that would allow for the expression of remediation can include "hard floor" designations in the grid to show when a student has achieved a defined level of competence.

Certain grids are made to give a very broad analysis of the complete curriculum. In practice, this can result in a multiplication error. For example, if the administrator is not careful, the same microcompetency can be represented in multiple competencies in the same grid. The best practical example is a grid that has both systems and disciplines represented. If the same microcompetency is in multiple competencies, and that microcompetency has several outcomes, there will be a multiplication effect error that incorrectly affects the student rankings. The achievement or deficiency in a specific microcompetency will be compounded relative to single microcompetencies. In some embodiments, that may be desired, but the skewing of the data expression may be anticipated.

Brief reference is made to FIGS. 7A and 7B, which illustrate two hierarchical competency lists (that can be used for a competency grid) with an exemplary list of associated microcompetency codes. The 00.01 et seq. list is for "Quantitative Methods" while the 00.02 et seq. list is for "Basic Genetics and Embryogenesis". In this manner, an extensible mechanism for evaluating the quality of a curriculum that is responsible for defining competency may be provided. Additionally, all three types of educational techniques can be evaluated concurrently. The normalization processes allow every adopter to customize their analysis, as desired. Further, each institution may customize the evaluation tool e.g., instead of 15 minute time normalization, shorter or longer standards may be used, e.g., 5 minutes or 30 minutes. Each institution may then generate different microcompetencies that may be further normalized when comparing between institutions.

Figure 8:
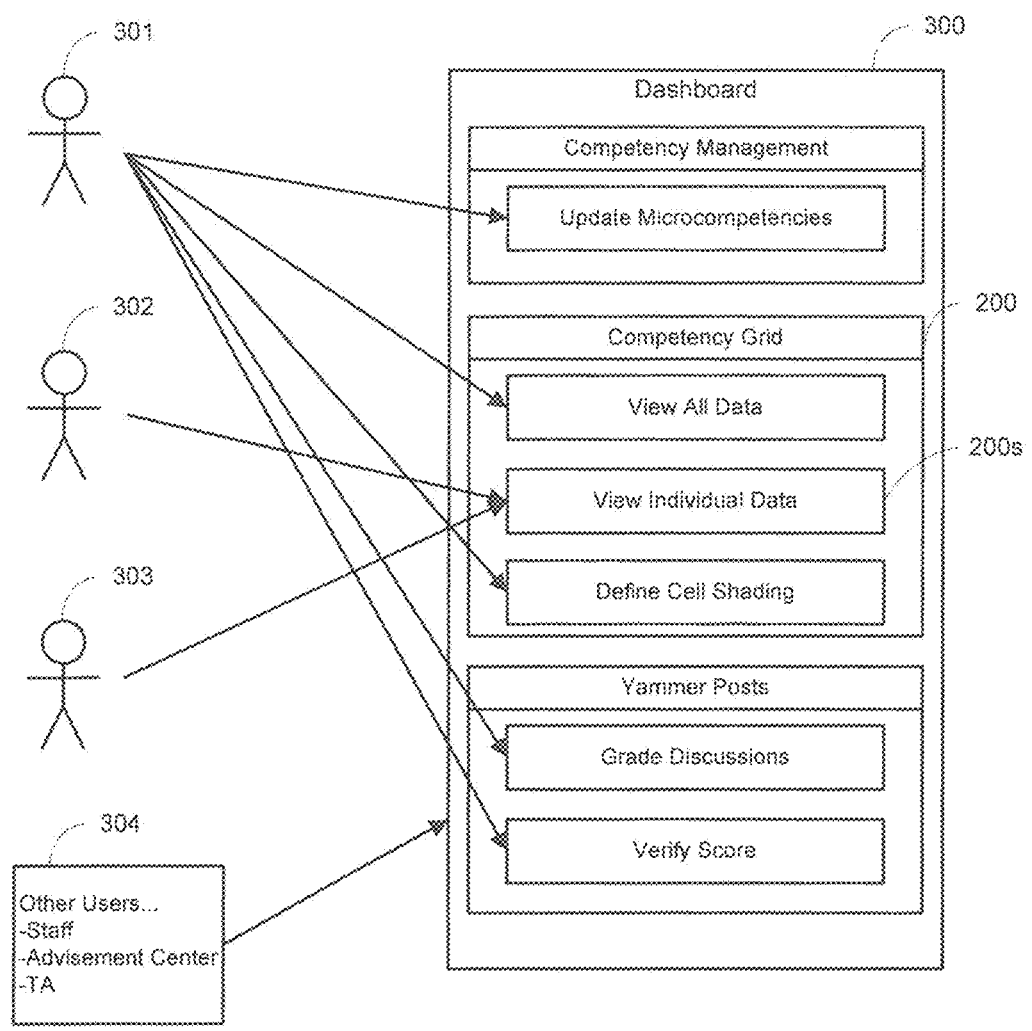
FIG. 8 is a schematic illustration of a dashboard with restricted views based on user profiles/types according to embodiments of the present invention.

Brief reference is now made to FIG. 8, which is a schematic illustration of a dashboard 300 that restricts the type of data that can shown to different users. Some embodiments of the system 10 can restrict information/functionality based on who logs into the dashboard 300. Initially, the users may be characterized as one of three types of users that will be accessing the dashboard. The dashboard (or portal) can define more specific access rights as additional dashboard elements are created (Yammer® grading and microcompetency management). Examples of user types according to some embodiments include:

User: (teacher, professor 301)
  access all information and functionality
Educational (University) Admin 302
  Can only view competency grid (no access to microcompetency management or yammer areas).
  FERPA: to comply with FERPA the Student ID column can be omitted as needed.
Student 303
  Can only view their scores in the competency grid 200. The competency grid 200 may be customized to show only the student data, but the grid 200 may also show student high and class averages.

Other users 304 may include teachings assistants, staff, advisors, publishers of educational resources (identify materials that provide better student outcomes or those that need improvement), teacher evaluation functions (for awards or correctional help), accreditation services, and/or licensing boards, among others. Again, as needed to comply with privacy rights, employment laws and the like, the type of data presented to different users can be controlled.

Some embodiments disclosed herein may be particularly suitable for evaluating health-science students, schools, classes, education materials (e.g., books) and/or curriculums. However, other embodiments can be used to evaluate other students, schools, curriculums, teachers, classes, resource books and the like. The term "health-science" refers to medical-related educational fields, including nursing, dental, pharmacy, medical doctors, veterinarians, psychiatrists, psychologists, physical therapists, other therapists and practitioners, particularly those health/science fields where board certification may be required for practice in a particular field.

Many educational programs may require proof of knowledge, skills, and inter-disciplinary problem solving. Some embodiments provide systems and processes for a continuous (over time) and, optionally, substantially simultaneous analysis of performance from didactically-focused, skill-based, and problem-based environments. Educational outcomes can be forecasted and cognitive success identified in a pro-active manner.

Referring to FIG. 2, the system 10 can include an electronic competencies assessment platform 100p. The term "competencies assessment platform" refers to a module, circuit, and/or processor that can accept data from and/or integrate a combination of different systems and defined variables for analysis of cognitive outcomes in competency-based education environments related to a defined set or sets of microcompetencies related to one or more competency areas. The competencies assessment platform 100p may creates an ongoing substantially constant (e.g., updated over time, but not necessarily real time) cumulative analysis of competencies as defined by formative and summative evaluation components.

Some embodiments disclosed herein contemplate that substantially all outcomes from all platforms build toward competency. Thus, all formative reports can be aggregated into a common analysis if all events use the same criteria. For example, each individual can be given credit for a certain number of points per microcompetency per event. If the cognitive outcomes for a competency can be represented as an aggregation of microcompetencies, then an infinite number of cumulative analyses can be generated from the same data set. Examples of some steps that can be used for cumulative analysis steps are summarized below:

Step 1. The cumulative data storage is defined as one or more data repository for every outcome event for an individual. Regardless of the source platform (didactic, clinical, or discussion), the individual may be given credit for points associated for each microcompetency. Thousands of these events may accumulate over time, platform, and assessment.

Step 2. Cumulative analysis mapping as disclosed herein may provide an institution with the ability to define how the raw data will be aggregated for display and analysis. A competency is a statement of the subset of content that an institution uses to evaluate performance. The mapping allows the institution to define a competency in terms of different combinations of microcompetencies. Some embodiments provide that there can be multiple maps of differing detail. Each competency may aggregate an individual's performance by combining the performance of each microcompetency. The assumed cross-reference is a set of individuals that make up a cohort. The mapping allows the institution to determine what individuals make up a cohort.

Step 3. Additional cross-cohort data can be assessed and placed in the same grid. For example, maximum performance, minimum performance, cohort averages, minimal achievable levels, and other items of interest may be assessed and placed in the grid.

Step 4. Desired data to be shown in a display grid 200 or grids can be defined.

Some embodiments of the invention may use a computing architecture in which the user interface, the application processing logic, and/or the underlying database(s) can be encapsulated in logically-separate processes. In any given application utilizing this type of computing architecture, the number of tiers may vary depending on the requirements of the particular application; thus, such applications are generally described as employing an n-tier architecture. See, e.g., Exforsys.com, N-Tier Client-Server Architecture. For instance, some embodiments of the invention may employ a 2-tier architecture, commonly referred to as a client-server architecture, wherein a client application such as a web browser makes a request from a web server, which processes the request and returns the desired response (in this case, web pages). Other embodiments of the invention may be structured as a peer to peer or a 3-tier or other larger multi-tier architecture. For the latter, the web server provides the user interface by generating web pages requested by a web browser, which receives and displays code in a recognized language such as dynamic HTML (Hypertext Markup Language); middleware executing on an application server handles the business logic; and database servers manage data functions. Often, the business logic tier may be refined into further separate tiers to enhance manageability, scalability, and/or security.

Accordingly, in some web-based hearings services, the web applications can use a 3-tier architecture with a presentation tier, a business logic tier, and a student record data tier. The web application tiers may be implemented on a single application server, or may be distributed over a plurality of application servers. For example, the presentation tier can provide the discussion modality 80 using web pages that allow a user to request student responses and allow communication between the student and an educator (e.g., teacher or professor). The presentation tier may communicate with other tiers in the application such as the business logic tier and/or student record data tier by accessing available components or web services provided by one or more of the other application tiers or by third party service providers. The presentation tier may communicate with another tier to allow authorized users to access student record data and/or database stored microcompetency codes, procedures, instructions, or protocols. The business logic tier can coordinate the application's functionality by processing commands, restricting user access and evaluating data. The functionality of the business logic tier may be made accessible to other application tiers by, for example, the use of web services. The business logic tier may also provide the logic, instructions or security that can separate and distinguish users. While the student data record tier can hold the private student records data and encapsulate such records from unapproved parties so as to comply with FERPA or other privacy regulations. The student records data tier can make data available through, for example, stored procedures, logic, instructions and the like accessible, for example, by web services.

Figure 9:
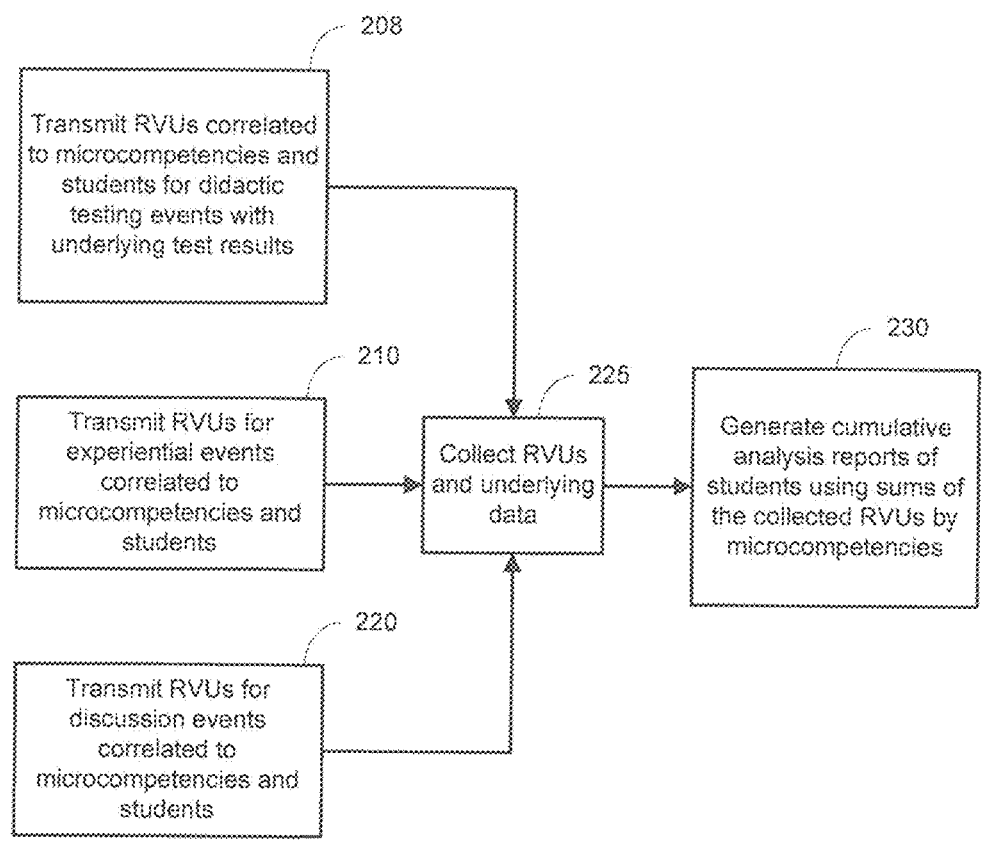
FIG. 9 is a flow chart of exemplary operations that can be performed according to some embodiments of the present invention.

FIG. 9 is an example of method steps that can be carried out according to embodiments of the present invention to evaluate students cognitive progression in a competency-based manner. As shown, RVUs for didactic testing events, correlated to student and microcompetencies, are transmitted to and collected by a student data record repository (e.g., database with memory such as one or more servers) (blocks 208, 225). Similarly, RVUs for experiential events, correlated to students and microcompetencies are transmitted to and collected by a student data record repository (blocks 210, 225). RVUs for discussion events, correlated to students and microcompetencies are transmitted to and collected by a student data record repository (blocks 220, 225). The same or different repositories may be used, e.g., different ones for different students, schools, different type of student record, and the like. Cumulative analysis reports can be generated for respective students by summing collected RVUs by microcompetencies (block 230). The reports can be generated automatically over time (e.g., daily, weekly, monthly) and/or upon request. The minimum threshold that establishes satisfactory cognition for a particular topic (e.g., microcompetencies) can be changed over time by a defined user (not student) to account for educational progression. The reports can be customized to block data or present only defined fields of data, depending on user-based access privileges as discussed above. The reports (particularly, where student identifiers are present) can be sent to an email account or placed on a secure (restricted) web portal. The student can define how often to receive such a report at log-in or set-up (or such a report may be based on a default action), or a student may request a report by accessing the web portal. Some systems may automatically send the student a report when a cumulative summary report indicates that one or more microcompetencies scores is below a desired threshold at that point in time.

As will be appreciated by one of skill in the art, embodiments of the invention may be embodied as a method, system, data processing system, or computer program product. Accordingly, the present invention may take the form of an entirely software embodiment or an embodiment combining software and hardware aspects, all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic or other electronic storage devices.

Computer program code for carrying out operations of the present invention may be written in an object oriented programming language such as Java, Smalltalk, C#or C++. However, the computer program code for carrying out operations of the present invention may also be written in conventional procedural programming languages, such as the "C" programming language or in a visually oriented programming environment, such as Visual Basic.

Certain of the program code may execute entirely on one or more of a user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). Typically, some program code executes on at least one web (hub) server and some may execute on at least one web client and with communication between the server(s) and clients using the Internet.

The invention is described in part below with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer readable memory or storage that can direct a computer or other programmable data processing apparatus to function in a particular manner, such that the instructions stored in the computer readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks. The Internet can be accessed via any desired device having access to the Internet including wireless or hard-wired communication systems (such as cellular telephones), PDAs, desktop or portable computers including lap or handheld computers, notebook computers, and the like.

Figure 10:
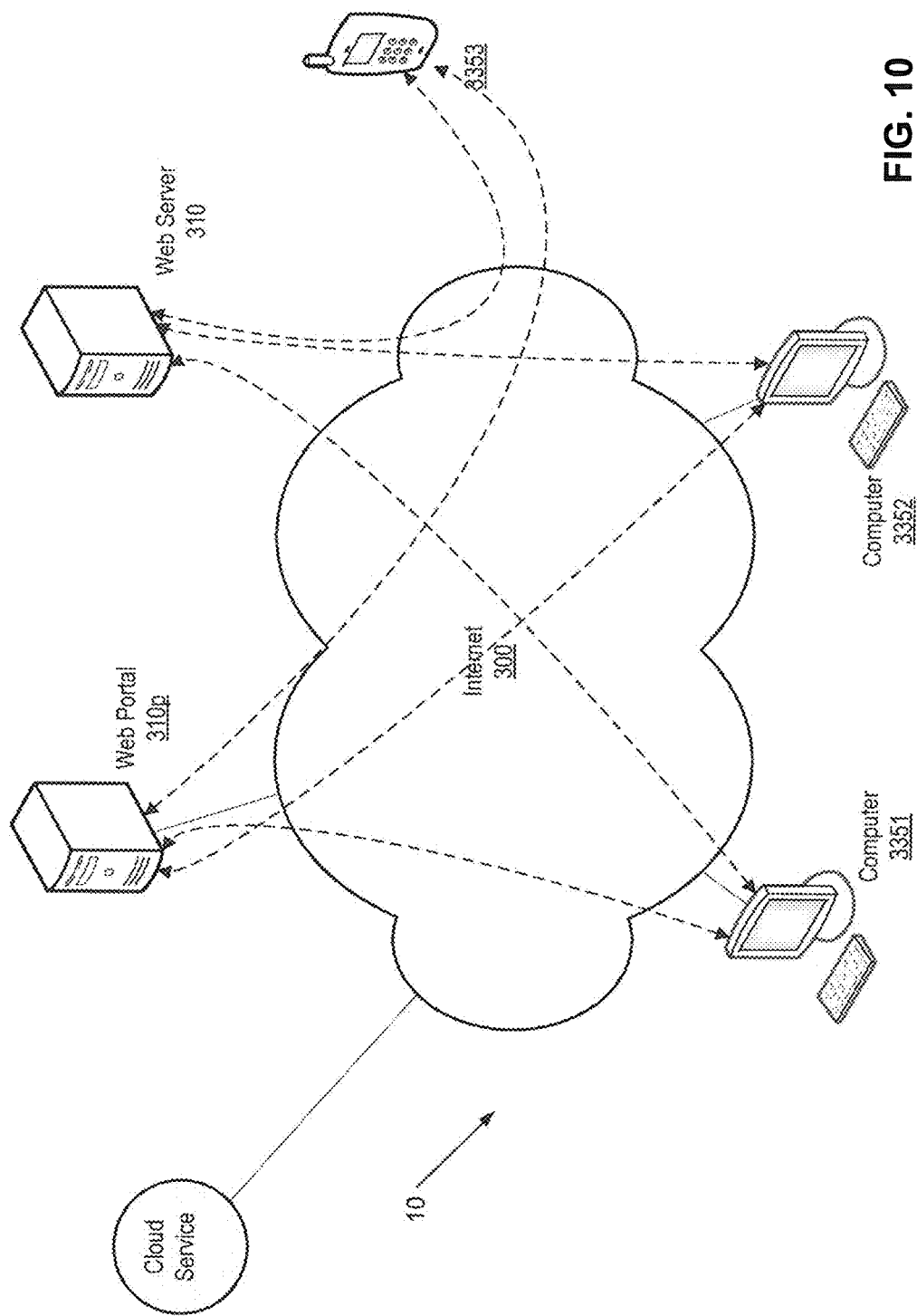
FIG. 10 is a schematic illustration of one example of a web-based system according to some embodiments of the present invention.

Referring to FIG. 10, in some embodiments, the system 10 includes at least one web server 310 (which may be provided by an online communications provider such as Yammer®) and a plurality of web clients 3351-3352. Although illustrated as two web client, the number of web client may be substantially more than two and may vary by institution (numbers of participating students, administrators and teachers/professors or other educators), typically, is between 100-10,000, for a respective institution, or even more, corresponding to the number of registered users. Some of the users can communicate with the system 10 via any suitable device having website browsing capability, including, for example, PDAs and/or cellular telephones 3353 as shown in FIG. 10. Thus, for example, a professor user can communicate with the student user during a discussion event via the Internet 300 using a PDA (personal digital assistant), notebook or cellular telephone having web-browsing capability (or palm, laptop or desktop computer).

The at least one web server 310 can include a single web server as a control node (hub) or may include a plurality of servers (not shown) providing a web portal 310p. The system 10 can also include routers (not shown). For example, a router can coordinate privacy rules on data exchange or access. Where more than one server is used, different servers (and/or routers) may execute different tasks or may share tasks or portions of tasks. For example, the system 10 can include one or combinations of more than one of the following: a security management server, a registered participant/user directory server, a student record management server, and the like. The system 10 can include firewalls and other secure connection and communication protocols. For Internet based applications, the server 310 and/or at least some of the associated web clients 35 can be configured to operate using SSL (Secure Sockets Layer) and a high level of encryption. Furthermore, given the ubiquitous nature of the Internet, web-access devices may readily be moved from site to site. Additionally, additional security functionality may also be provided. For example, incorporation of a communication protocol stack at the client and the server supporting SSL communications or Virtual Private Network (VPN) technology such as Internet Protocol Security Architecture (IPSec) may provide for secure communications between the student sites and other sites to thereby assure privacy.

The server 310 can provide a centralized administration and management application. The server 310 can be configured to provide session management, tracing and logging systems management, workload management and member services. The server 310 can include or communicate with a plurality of databases including participant/user profiles, a security directory, routing security rules, and student records. The server 310 can include several sub-servers for integration into web systems, such as, but not limited to, a web application server (WAS) which may comprise an IBM WebSphere Application Server, a Directory Server such as an LDAP directory server, and may include an Anonymous Global Patient Identifier (AGPI) Server, a DB2 Server, and a Simple Mail Transfer Protocol (SMTP) Server. It is noted that although described herein as "servers" other suitable computer configurations may be used. The server 310 can be configured with web application functions that appear at portal sites. The server 310 may comprise and/or be configured as a Web Sphere Business Integration (WBI) server. The web server 310 can include a web-based administration application. The web application can be used to: allow a user to register as a participant, manage Access Control Lists (ACLs), logon using universal ID or password access, logoff, define profile preferences, search, participate in discussion events and the like.

The web clients 3351-3352 can be associated with different users and different user categories or types. Each category or type may have a different "privilege" or access level to actions or data associated with the systems 10. For example, the systems 10 can include student users, administrative users, and teacher/professor users, each of which can have different access levels or restrictions to data and/or actions allowed by the system.

The web clients 3351, 3352 can be distributed at different geographic locations in different time zones and states or even countries. In other embodiments, the web clients 35 can be at a single educational center. Different user types may be at different geographic locations.

As noted above, the clients may include webcams or cameras to allow for multimedia communication during some discussion or some experiential events, for example.

Figure 11:
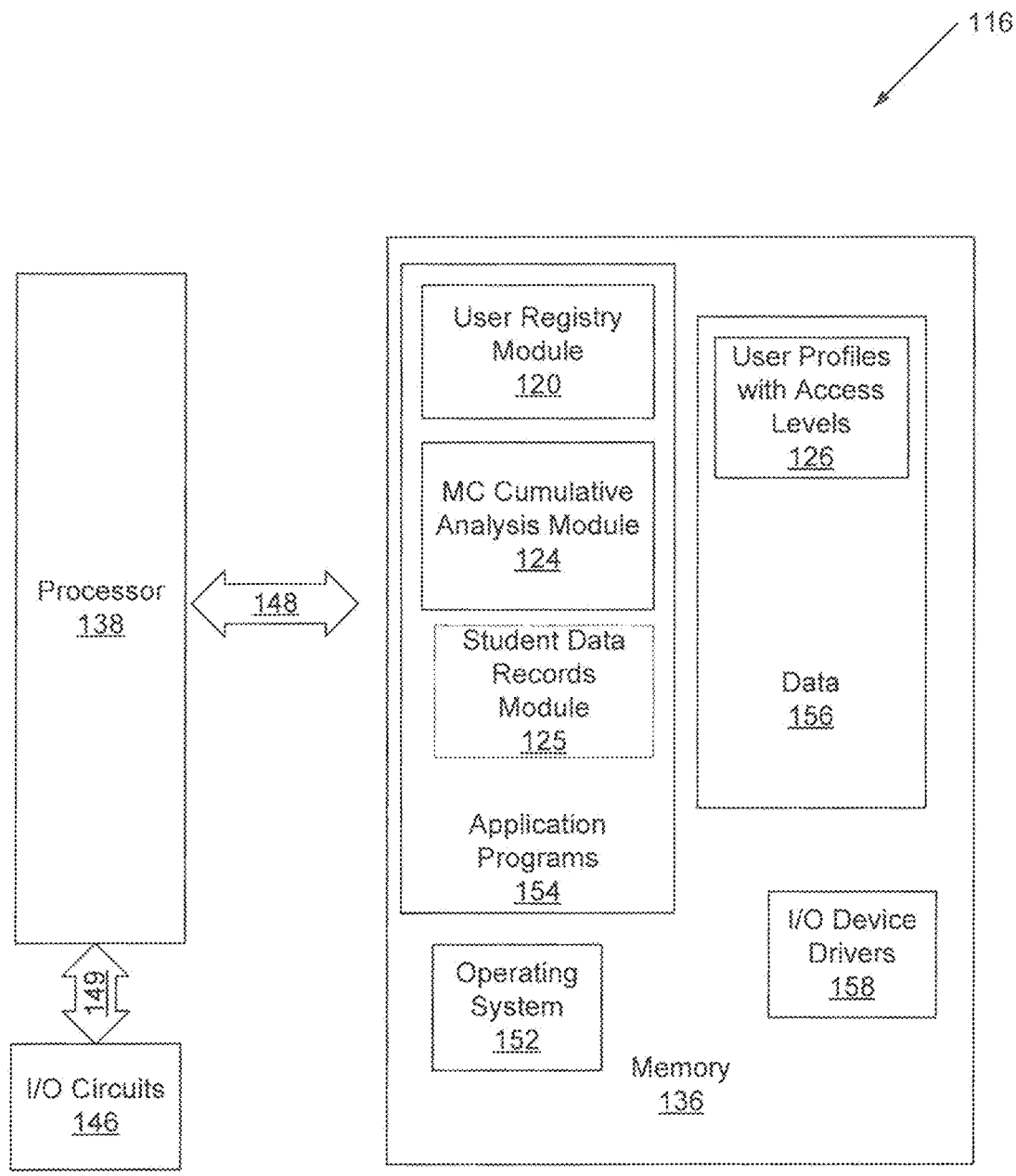
FIG. 11 is a block diagram of a data processing system according to some embodiments of the present invention.

FIG. 11 illustrates an exemplary data processing system or database environment that may be included in devices operating in accordance with some embodiments of the present invention. As illustrated in FIG. 11, a data processing system 116 which can be used to carry out or direct operations of the hub and/or web application (e.g., comprising an Administrative Server) includes a processor 138, memory 136 and input/output circuits 146. The data processing system may be incorporated in, for example, one or more of a personal computer, server, router, or other device with web access/functionality. The processor 138 communicates with the memory 136 via an address/data bus 148 and communicates with the input/output circuits 146 via an address/data bus 149. The input/output circuits 146 can be used to transfer information between the memory (memory and/or storage media) 136 and another computer system or a network using, for example, an Internet protocol (IP) connection. These components may be conventional components such as those used in many conventional data processing systems, which may be configured to operate as described herein.

In particular, the processor 138 can be commercially available or custom microprocessor, microcontroller, digital signal processor or the like. The memory 136 may include any memory devices and/or storage media containing the software and data used to implement the functionality circuits or modules used in accordance with embodiments of the present invention. The memory 136 can include, but is not limited to, the following types of devices: cache, ROM, PROM, EPROM, EEPROM, flash memory, SRAM, DRAM and magnetic disk. In some embodiments of the present invention, the memory 136 may be a content addressable memory (CAM).

As further illustrated in FIG. 11 the memory (and/or storage media) 136 may include several categories of software and data used in the data processing system: an operating system 152, application programs 154, input/output device drivers 158, and data 156. The application programs can include a User Registry Module 120, a Microcompetency Cumulative Analysis Module 124, a Student Data Records Module 125, and the like. The data 156 can include user profiles with defined access levels 126. The user profiles 126 may additionally or alternately include an application program.

The data processing system 116 can include a Trend Analysis Module (that may be an application program similar to the modules discussed above with respect to FIG. 11) that can access electronically stored student test records and underlying cohort data and generate a visual output/display of a graph of test trends. A trend can be electronically generated and shown on a display associated with a client 35 (e.g., an administrator, professor/teacher, or student. The trend can be in graphic form and may indicate a risk of failure or a need for an intervention or adjustment in a curriculum based at least in part on the results. The system 10 can be configured to generate a "flag" that increases the report frequency if a student (or group of students or a particular class) is identified as being below minimum. The system 10 may also be configured to alert students, advisors, professors/teachers via email, postal mail and/or using text messages or other suitable communication protocol to notify one or more of a negative trend or a "failure" in one or more microcompetencies.

As will be appreciated by those of skill in the art, the operating system 152 may be any operating system suitable for use with a data processing system, such as, but not limited to, those from Microsoft, Inc. (Windows), Apple Computer, Inc. (MacOS), Wind River (VxWorks), RedHat (Linux), LabView or proprietary operating sytems. The input/output device drivers 158 typically include software routines accessed through the operating system 152 by the application programs 154 to communicate with devices such as the input/output circuits 146 and certain memory 136 components. The application programs 154 are illustrative of the programs that implement various features of the circuits and modules according to some embodiments of the present invention. Finally, the data 156 represents the static and dynamic data used by the application programs 154, the operating system 152, the input/output device drivers 158 and other software programs that may reside in the memory 136.

While the present invention is illustrated with reference to the application programs 120, 124, 125 in FIG. 11 as will be appreciated by those of skill in the art, other configurations fall within the scope of the present invention. For example, rather than being application programs 154 these circuits and modules may also be incorporated into the operating system 152 or other such logical division of the data processing system. Furthermore, while the application programs 120, 124, 125 (122) are illustrated as modules in a single data processing system, as will be appreciated by those of skill in the art, such functionality may be distributed across one or more data processing systems. Thus, the present invention should not be construed as limited to the configuration illustrated in FIG. 11 but may be provided by other arrangements and/or divisions of functions between data processing systems. For example, although FIG. 11 is illustrated as having various circuits and modules, one or more of these circuits or modules may be combined without departing from the scope of the present invention.

Typically, during "on-boarding" or customer set-up, a client 35 is brought into the network or system 10 and assigned one or more privacy levels based on a legal or organizational entitlement to send and/or receive certain types (and/or content) of data. An organization may include one or a plurality of web clients 35, each with one or more different assigned privacy levels. The privacy level can define what data that entity or person associated with that entity can receive, send or access.

Figure 12:
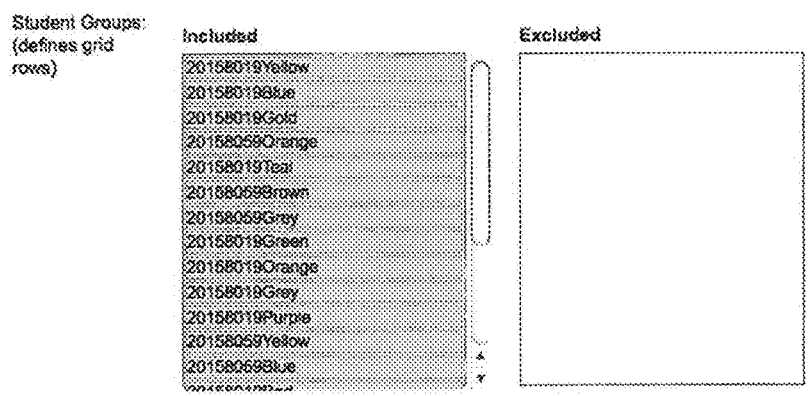
FIG. 12 is a screen shot of a graphical user interface for a sub-cohort manager according to some embodiments of the present invention.

Brief reference is now made to FIG. 12, which is a screen shot of a graphical user interface for a sub-cohort manager according to some embodiments of the present invention. As illustrated, student groups may be created and/or modified by including or excluding specific individuals. As illustrated, no individuals are shown as being excluded from the example sub-cohort. In some embodiments, the student groups may be used to define the grid rows (FIG. 16, 202) for an interactive evaluation grid 200.

Reference is now made to FIG. 13, which is a screen shot of a graphical user interface for a summative report after grading according to some embodiments of the present invention. Note that the specific post authors, which are listed in the "Post Author" column are redacted from the screen shot. Each line in the report corresponds to a single post made in a discussion event. For each post, the type of post (e.g., Student Post Logistics, Student Post Content, Faculty Post Guidance, Student Post Other, etc.), the identifications of ay applicable microcompentencies, and a corresponding RVU may be listed. In addition, a comment field is provided to receive and record any comments for each post.

Reference is now made to FIG. 14, which is a screen shot of a graphical user interface for a post verification report before the data is submitted to the grid according to some embodiments of the present invention. The post verification report may provide a RVU Commit Summary portion that summarize the students and corresponding RVUs in a discussion event. Additionally, a Student Posts portion may provide a detailed report of each student in the discussion event and the microcompetencies and corresponding RVUs earned therein. Additionally, a Group Overview Portion may provide a detailed report of the group total microcompetencies and corresponding RVUs earned in the discussion event.

Figure 15:
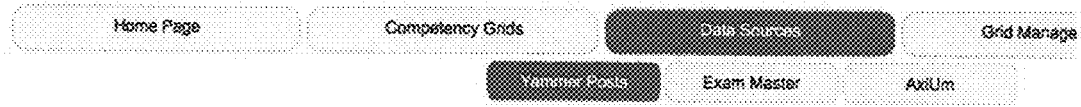
FIG. 15 is a screen shot of a graphical user interface for a managing submitted reports according to some embodiments of the present invention.

Reference is now made to FIG. 15, which is a screen shot of a graphical user interface for a managing submitted reports according to some embodiments of the present invention. The user interface may include a "committed" status indicator, and columns for the date, the course identifier, the group identifier and the grading summary for each of the committed discussion events.

Figure 16:
FIG. 16 is a partial screen shot of an exemplary interactive evaluation grid that is parsed to display a single anatomical system according to some embodiments of the present invention.

Reference is now made to FIG. 16, which is a partial screen shot of an exemplary interactive evaluation grid 200 that is parsed to display a single system according to some embodiments of the present invention. As discussed above, as the evaluation grid is interactive, it may be also referenced as a graphical user interface. As illustrated, the parsed grid represents grid data corresponding to the musculoskeletal system. The student identifiers (Student #) are redacted from the screen, but are understood to be the unique identifiers corresponding to different students, which correspond to rows in the grid. The columns in the grid correspond to the sub-topics in and/or related to the musculoskeletal system. The total number of points within musculoskeletal system may be provided as well as high, low and average points corresponding to each sub-topic.

Reference is now made to FIG. 17, which is a partial screen shot of a graphical user interface for a managing an interactive evaluation grid according to some embodiments of the present invention. The grid manager may list each of the grids that are currently defined. In this manner, a single interface screen may provide selection and access where multiple grids are presented for editing.

Figure 18:
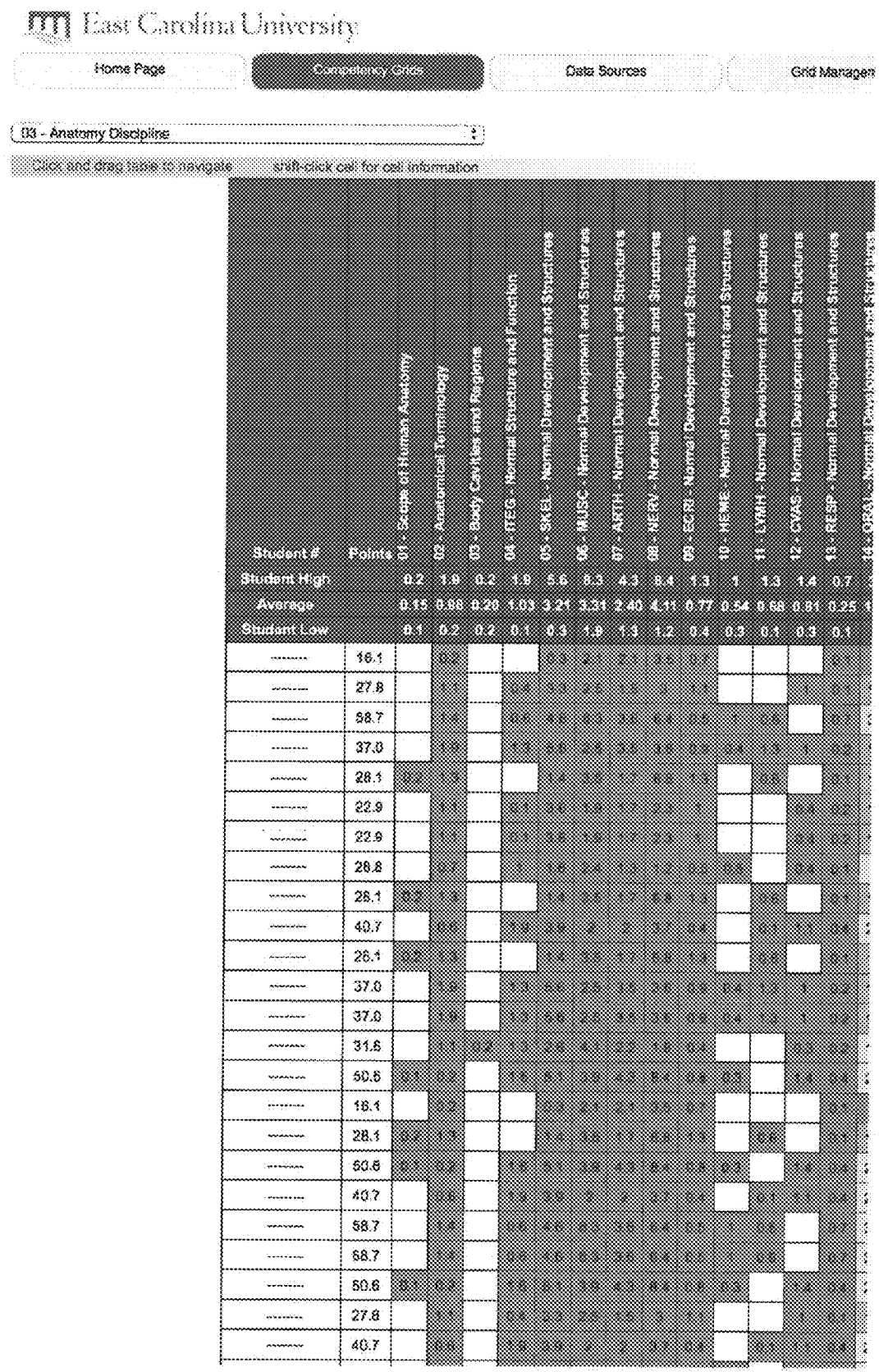
FIG. 18 is a partial screen shot of an exemplary interactive evaluation grid that is parsed to analyze the data by a single discipline according to some embodiments of the present invention.

Reference is now made to FIG. 18, which is a partial screen shot of an exemplary interactive evaluation grid that is parsed to analyze the data by discipline according to some embodiments of the present invention. As illustrated, the parsed grid represents grid data corresponding to the anatomy discipline. The student identifiers (Student #) are redacted from the screen, but are understood to be the unique identifiers corresponding to different students, which correspond to rows in the grid. The columns in the grid correspond to the sub-topics in and/or related to the anatomy discipline. The total number of points within anatomy discipline may be provided as well as high, low and average points corresponding to each sub-topic.

Brief reference is made to FIG. 19, which is a partial screen shot of a graphical user interface according to some embodiments of the present invention. Some embodiments of the user interface include a component of the interactive evaluation grid that allows selective viewing of one or more modalities and provides for the definition of the analysis time interval. For example, the analysis time interval may be selected by identifying start and stop times and/or dates of the desired interval.

Brief reference is made to FIG. 20, which is a screen shot of a graphical user interface of a cohort manager according to some embodiments of the present invention. As illustrated, the cohort manager may be used to determine which students and faculty are included in the cohort. For example, student or faculty names may be selected and moved from the excluded window to the included window to identify members of a cohort.

Figure 21:
FIG. 21 is a screen shot of a graphical user interface for a managing an interactive evaluation grid where competencies include microcompetency codes according to some embodiments of the present invention.

Reference is now made to FIG. 21, is a partial screen shot of a graphical user interface for a managing an interactive evaluation grid according to some embodiments of the present invention. As illustrated, where competencies, such as, for example, "03 Anatomy Discipline" may be defined by and/or correspond to multiple microcompetencies, which may be listed and displayed in an associated scrollable window.

Figures 22, 23:
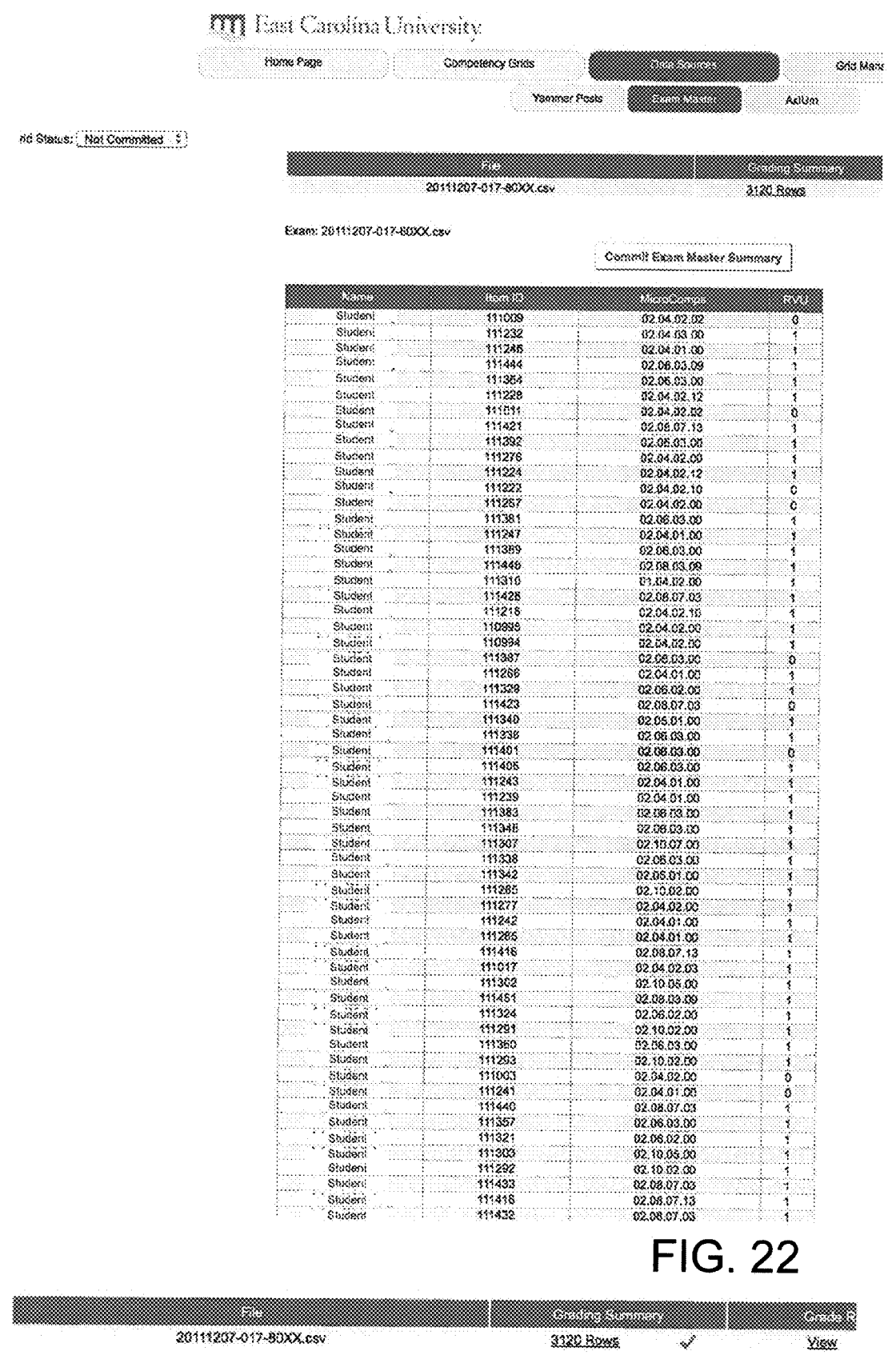

Reference is now made to FIG. 22, which is a screen shot of a graphical user interface illustrating raw imported exam data after an item analysis has been performed according to some embodiments of the present invention. A didactic exam is a series of binary events that are presented to test-takers so they can make the binary choice. A learning management system, as disclosed herein is irrelevant to the result of the completed exam for a specific cohort. In some embodiments, the result of an exam is a simple delimited file that includes the following data for each test item: unique student identifier; test item identifier; microcompetency code; binary choice (0 for incorrect, 1 for correct); and relative value unit. For an exam with 100 questions for 10 students, the resultant file will have 1000 rows for these four columns of data. Some embodiments provide that when the file is imported three additional items may be added, namely: program identifier (school, university, etc); date of exam; and course identifier. Once the raw data is digested into the data source environment, the raw data is listed exactly as the raw import file as a first check for validation. As illustrated, the raw imported exam data includes a row for each test item identifier. In some embodiments, each row may include the name (or identifier) of the student, the test item identifier (i.e., which exam question), the associated microcompetency and the earned RVU. Once the raw data is digested into the data source environment, the raw data is listed exactly as the raw import file as a first check for validation. A comparison with the original delimited file can be done manually or programatically.

Brief reference is made to FIG. 23, which is a partial screen shot of a graphical user interface for checking a raw data report in preparation for validation according to some embodiments of the present invention. A comparison to the grading summary, which lists how many rows are in the raw import display may be useful in identifying in under and/or over inclusions of data corresponding to the exam data.

At this point the administrator "commits" the raw data for conversion from binary presentation to microcompetency presentation. Each student is represented with a summary of the points by microcompetency. Multiple questions in one exam may have the same microcompetency designation. The total number of points (RVUs) is then validated against the original number of points that the learning management system calculated in the binary presentation. As such, this step converts individual test items to topic-associated results.

Figure 24:
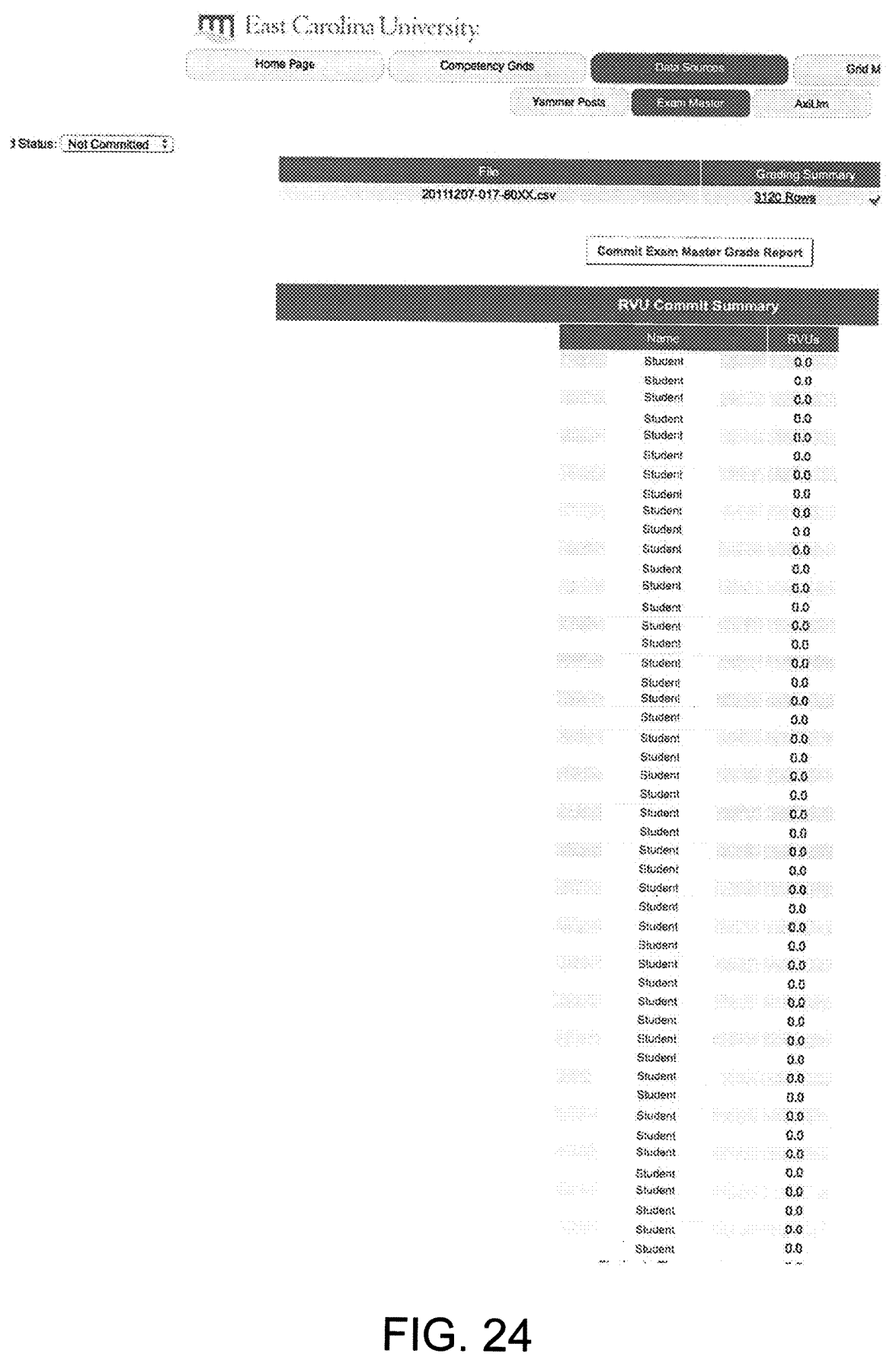

Brief reference is made to FIG. 24, which is a screen shot of a graphical user interface illustrating an RVU commit summary screen before the data is committed according to some embodiments of the present invention. Note that before the data is committed, as indicated by the status "Not Committed", the RVUs in the RVU Commit Summary are displayed as 0.0.

Figure 25:
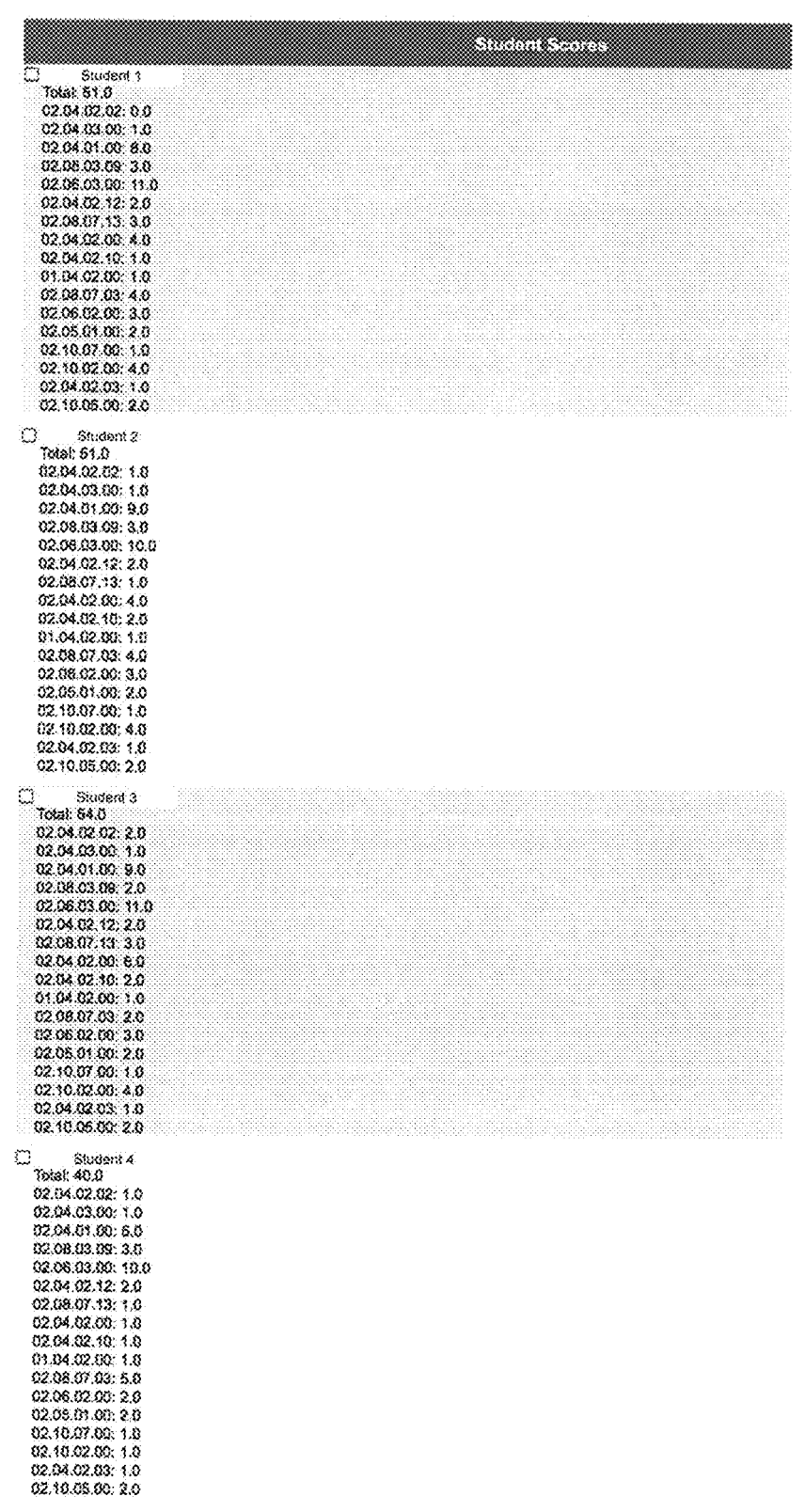

Reference is now made to FIG. 25, which is a partial screen shot of a graphical user interface illustrating data that was collected and merged by microcompetency code according to some embodiments of the present invention. The student scores are displayed for an administrator or other evaluator to commit the data. For each student, a total RVU is indicated, and RVUs for each microcompetency are listed. Some embodiments provide an approval interface, such as, for example a button or check box. As a separate step, the administrator manually validates that the number of RVUs is correct with a check step.

Figure 26:
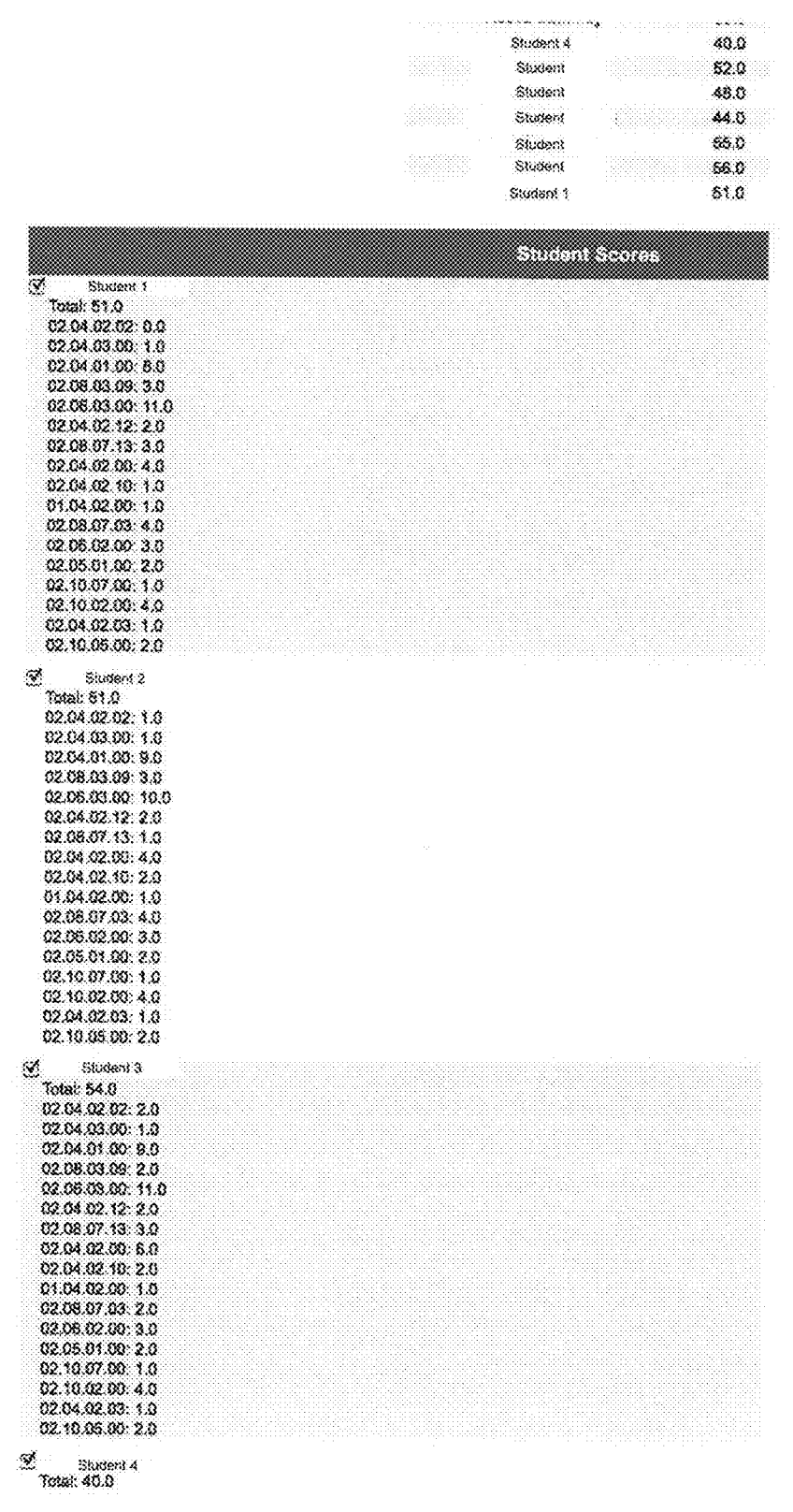

Reference is now made to FIG. 26, which is a screen shot of a graphical user interface illustrating data that was collected and merged by microcompetency code and that has been verified to provide all students with the correct score according to some embodiments of the present invention. Note that each of the student check boxes are selected indicating that the data has been verified. Additionally, referring to FIG. 27, which is a partial screen shot of a graphical user interface illustrating the RVU commit summary screen that includes the scores ready to commit to the grid according to some embodiments of the present invention, when the data is checked it moves the points to a commit summary data page for one remaining check.

After validation, each data element is stored to the common data repository with a unique identifier. The data may be represented in the grid based on the rules of the specific grid. For example, exam data may parse in grids where exam data is supposed to be displayed.

One must appreciate the importance of the validation steps. The resulting grid depends on the correct assignment of microcompetency codes to exam items and the aggregation of this data for representation. Important decisions about student weakness and strength may be made based on the grid data. The aggregate data page associates the student points with the specific student. When the administrator is satisfied that the data is correct, they will "commit" a grade report to the grid for display. The import file is tagged as "committed" and the next file is encountered.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A computer program product for operating an electronic evaluation platform comprising a presentation tier, a business logic tier in communication with the presentation tier, and a data record tier in communication with the presentation tier and the business logic tier, the computer program product comprising a non-transitory computer readable storage medium having computer readable program code embodied in the medium that when executed by at least one processor causes the at least one processor to perform operations comprising:

creating, by the data record tier and/or the business logic tier, a plurality of unique data records within the data record tier, respective ones of the plurality of unique data records comprising:
a unique microcompetency code that is associated with an activity performed by a respective individual of a plurality of individuals; and
a relative educational value unit (RVU) quantity associated with the activity;

for each of the plurality of individuals, automatically combining RVU quantities for each of the unique microcompetency codes that are associated with the respective individual to generate a summed RVU quantity per unique microcompetency code; and generating, by the presentation tier, a cumulative analysis grid that indicates, for each of the unique microcompetency codes, a comparison result between the summed RVU quantities for one or more of the individuals and a threshold calculated by the business logic tier, wherein the operations further comprise:

generating and/or associating, by the business logic tier, a data flag with a first individual of the plurality of individuals responsive to the summed RVU quantity for the first individual being below the threshold for at least one of the unique microcompetency codes, increasing, by the business logic tier, an update frequency of the calculation of the summed RVU quantity of the at least one of the unique microcompetency codes for the first individual responsive to a presence of the data flag.

2. A computer program product for operating an electronic student competency evaluation platform comprising a presentation tier, a business logic tier in communication with the presentation tier, and a student record data tier in communication with the presentation tier and the business logic tier, the computer program product comprising a non-transitory computer readable storage medium having computer readable program code embodied in the medium that when executed by at least one processor causes the at least one processor to perform operations comprising:

providing a portal that defines access rights for different users, including student users, administrative users and educator users;

creating, by the data record tier and/or the business logic tier, a plurality of unique data records within the student record data tier for each of a plurality of students of an academic cohort, each respective one of the plurality of unique data records comprising:

a didactic relative educational value unit (RVU) quantity associated with a didactic activity electronically correlated to one or more unique microcompetency codes;

an experiential RVU quantity associated with an experiential activity electronically correlated to the one or more of the unique microcompetency codes; and a discussion RVU quantity associated with a discussion activity electronically correlated to the one or more of the unique microcompetency codes;

for each student, calculating, by the business logic tier, a summed RVU quantity of the didactic, experiential, and discussion RVU quantities from the student record data tier;

calculating, by the business logic tier, a competence threshold for each of the unique microcompetency codes based on the summed RVU quantities of the didactic, experiential, and discussion RVU quantities from the student record data tier; and generating, by the presentation tier, a presentation interface that comprises a cumulative analysis grid that indicates a comparison of the plurality of students to the competence thresholds, wherein a respective competence threshold is defined for one of the unique microcompetency codes, a group or groups of the unique microcompetency codes, and/or one or groups of sub-microcompetencies corresponding to the one or more of the unique microcompetency codes, wherein the cumulative analysis grid is an interactive grid that includes elements that are selectable by the administrative users and/or the educational users via a graphical user interface, wherein, responsive to when an element or elements of the selectable elements is/are selected, the cumulative analysis grid electronically reveals underlying data supporting the selected element or the selected elements, wherein the cumulative analysis grid is configured to visually identify when students are identified as below minimum for the competence threshold of one or more of the unique microcompetency codes, and wherein the cumulative analysis grid is configured to allow only the administrative users and/or educator users to select a cohort of individuals identified as below the minimum of the competence threshold and provide individual student ratings in sub-microcompetencies, as well as common factors of the cohort thereby allowing educators and/or schools to adjust curriculums to address student needs where deficiencies are identified.

3. The computer program product of claim 2, wherein the operations further comprise:

automatically calculating, by the business logic tier, at least three standard deviations of the summed RVU quantities of the didactic, experiential, and discussion RVU quantities of the plurality of students for each of the one or more of the unique microcompetency codes, wherein the competence threshold calculated by the business logic tier is based on one or more of the three standard deviations of the summed RVU quantities.

4. The computer program product of claim 3, wherein the cumulative analysis grid provides rows and columns, with the columns providing the summed RVU quantities and the rows providing references to ones of the plurality of students, and wherein grid cells of the cumulative analysis grid are color coded based on a first standard deviation, a second standard deviation, and/or a third standard deviation of the summed RVU quantities.

5. The computer program product of claim 2, wherein the operations further comprise:

automatically generating a cumulative data record comprising the summed RVU quantities of the data records associated with each of the plurality of students for each of the one or more unique microcompetency codes;

modifying the cumulative data record to selectively remove identification information for each of the plurality of students; and automatically providing the cumulative data record to an accreditation and/or licensing service.

6. A computer program product for operating an electronic student competency evaluation platform comprising a presentation tier, a business logic tier in communication with the presentation tier, and a student record data tier in communication with the presentation tier and the business logic tier, the computer program product comprising a non-transitory computer readable storage medium having computer readable program code embodied in the medium that when executed by at least one processor causes the at least one processor to perform operations comprising:

creating, by the data record tier and/or the business logic tier, a plurality of unique data records within the student record data tier for each of a plurality of students of an academic cohort, each respective one of the plurality of unique data records comprising:

a didactic relative educational value unit (RVU) quantity associated with a didactic activity electronically correlated to one or more unique microcompetency codes;

an experiential RVU quantity associated with an experiential activity electronically correlated to the one or more of the unique microcompetency codes; and a discussion RVU quantity associated with a discussion activity electronically correlated to the one or more of the unique microcompetency codes;

for each student, calculating, by the business logic tier, a summed RVU quantity of the didactic, experiential, and discussion RVU quantities from the student record data tier;

calculating, by the business logic tier, a competence threshold for the one or more of the unique microcompetency codes based on the summed RVU quantities of the didactic, experiential, and discussion RVU quantities from the student record data tier; and generating, by the presentation tier, a presentation interface that comprises a cumulative analysis grid that indicates a comparison of a student of the plurality of students to the competence threshold for the one or more of the unique microcompetency codes, wherein the operations further comprise:

generating and/or associating, by the business logic tier, a data flag with a first student of the plurality of students responsive to the summed RVU quantity for the first student being below the competence threshold for a first unique microcompetency code of the one or more of the unique microcompetency codes, increasing, by the business logic tier, an update frequency of the calculation of the summed RVU quantity of the first unique microcompetency code for the first student responsive to a presence of the data flag.

7. The computer program product of claim 2, wherein each of the one or more of the unique microcompetency codes comprises a first topic code and a first sub-topic code dependent on the first topic code.

8. The computer program product of claim 2, wherein each of the didactic, experiential, and discussion RVU quantities comprises a time-based value that assesses a complexity of the respective didactic, experiential, and discussion activity.

9. A method of operating an electronic evaluation platform comprising a presentation tier, a business logic tier in communication with the presentation tier, and a data record tier in communication with the presentation tier and the business logic tier, comprising:

providing at least one defined set of unique microcompetency codes for an educational topic and/or curriculum;

providing a portal that defines access rights for different users including student users, administrative users and educator users;

creating, by the data record tier and/or the business logic tier, a plurality of unique data records within the data record tier, respective ones of the plurality of unique data records comprising:

a unique microcompetency code from the defined set of unique microcompetency codes that is associated with an activity performed by a respective individual of a plurality of individuals; and a relative educational value unit (RVU) quantity associated with the activity;

for each of the plurality of individuals, automatically combining RVU quantities for each of the unique microcompetency codes from the defined set of unique microcompetency codes that are associated with the respective individual to generate a summed RVU quantity per unique microcompetency code; and generating, by the presentation tier, an interactive cumulative analysis grid that indicates, for each of the unique microcompetency codes from the defined set of unique microcompetency codes, a comparison result between the summed RVU quantities for one or more of the individuals and a threshold calculated by the business logic tier, wherein the interactive cumulative analysis grid includes elements that are selectable by the administrative users and/or the educational users via a graphical user interface, wherein, responsive to when an element or elements of the selectable elements is/are selected, the cumulative analysis grid electronically reveals underlying data supporting the selected element or selected elements, wherein the cumulative analysis grid is configured to visually identify when students are identified as below minimum for the competence threshold of one or more of the unique microcompetency codes, and wherein the cumulative analysis grid is configured to allow only the administrative users and/or the educator users to select a cohort of individuals identified as below the minimum of the competence threshold and provide individual student ratings in sub-microcompetencies, as well as common factors of the cohort thereby allowing educators and/or schools to adjust curriculums to address student needs where deficiencies are identified.

10. The method of claim 9, wherein the RVU quantity comprises a time-based value that assesses a complexity of the activity.

11. The method of claim 9, further comprising:

automatically calculating, by the business logic tier, at least three standard deviations of the summed RVU quantities of the plurality of individuals for each of the unique microcompetency codes, wherein the threshold calculated by the business logic tier is based on one or more of the three standard deviations of the summed RVU quantities.

12. A method of operating an electronic evaluation platform comprising a presentation tier, a business logic tier in communication with the presentation tier, and a data record tier in communication with the presentation tier and the business logic tier, comprising:

creating, by the data record tier and/or the business logic tier, a plurality of unique data records within the data record tier, respective ones of the plurality of unique data records comprising:

a unique microcompetency code that is associated with an activity performed by a respective individual of a plurality of individuals; and a relative educational value unit (RVU) quantity associated with the activity;

for each of the plurality of individuals, automatically combining RVU quantities for each of the unique microcompetency codes that are associated with the respective individual to generate a summed RVU quantity per unique microcompetency code;

generating, by the presentation tier, a cumulative analysis grid that indicates, for each of the unique microcompetency codes, a comparison result between the summed RVU quantities for one or more of the individuals and a threshold calculated by the business logic tier;

generating and/or associating, by the business logic tier, a data flag with a first individual of the plurality of individuals responsive to the summed RVU quantity for the first individual being below the threshold for at least one of the unique microcompetency codes; and increasing, by the business logic tier, an update frequency of the calculation of the summed RVU quantity of the at least one of the unique microcompetency codes for the first individual responsive to a presence of the data flag.

13. The method of claim 9, wherein content of the graphical user interface is provided to the computer system by the presentation tier over a network between the computer system and the presentation tier; and selectively updating, by the presentation tier, the cumulative analysis grid to reveal the supporting unique data records from the data record tier and/or the business logic tier for a subset of the plurality of individuals that are associated with the selected element or selected elements.

14. A computer system for operating an electronic evaluation platform, the computer system comprising at least one processor configured to perform operations comprising:

providing defined unique microcompetency codes, wherein each microcompetency code comprises a series of numbers that is at least eight digits in length and that is correlated to an educational topic or subtopic;

providing a portal that defines access rights for different users including student users, administrative users and educator users;

creating a plurality of unique data records, respective ones of the plurality of unique data records comprising:

one or more of the defined unique microcompetency codes that is associated with an activity performed by a respective individual of a plurality of individuals; and a relative educational value unit (RVU) quantity associated with the activity;

for each of the plurality of individuals, automatically combining RVU quantities for each of the unique microcompetency codes that are associated with the respective individual to generate a summed RVU quantity per unique microcompetency code;

generating an interactive cumulative analysis grid that displays a first page of the cumulative analysis grid with a plurality of cells, wherein one cell of the plurality of cells is populated with summed RVU quantities for one of the unique microcompetency codes for one individual; and providing a graphical user interface that is configured to allow a user to select one or more cells of the plurality of cells to electronically automatically generate a second page of the cumulative analysis grid with supporting unique data records of a respective individual associated with the selected one or more cells, wherein the cumulative analysis grid is configured to visually identify when students are identified as below minimum for the competence threshold of one or more of the unique microcompetency codes, and wherein the cumulative analysis grid is configured to allow only the administrative users and/or the educator users to select a cohort of individuals identified as below the minimum of the competence threshold and provide individual student ratings in sub-microcompetencies, as well as common factors of the cohort thereby allowing educators and/or schools to adjust curriculums to address student needs where deficiencies are identified.

* * * * *

UNITED STATES PATENT AND TRADEMARK OFFICE
CERTIFICATE OF CORRECTION

PATENT NO. : 11,508,250 B2
APPLICATION NO. : 17/134922
DATED : November 22, 2022
INVENTOR(S) : Robert Todd Watkins, Jr.

It is certified that error appears in the above-identified patent and that said Letters Patent is hereby corrected as shown below:

In the Specification

Column 15, Line 34: Please correct "(micro competencies)." to read --(microcompetencies).--

Column 25, Lines 29-53: Please delete:
"2.06.01.00
2.06.01.01
2.06.01.02
2.06.01.03
2.06.02.00
2.06.02.01
2.06.02.02
2.06.02.03
2.06.02.04
2.06.03.00
2.06.03.01
2.06.03.02
2.06.03.03
2.06.03.04
2.06.03.05
2.06.03.06
2.06.03.07
2.06.03.08
2.06.03.09
2.06.03.10
2.06.03.11
2.06.03.12
2.06.03.13
2.06.03.14
2.06.03.15"

Signed and Sealed this
Fourteenth Day of March, 2023

Katherine Kelly Vidal
*Director of the United States Patent and Trademark Office*

And insert:
--02.06.01.00
02.06.01.01
02.06.01.02
02.06.01.03
02.06.02.00
02.06.02.01
02.06.02.02
02.06.02.03
02.06.02.04
02.06.03.00
02.06.03.01
02.06.03.02
02.06.03.03
02.06.03.04
02.06.03.05
02.06.03.06
02.06.03.07
02.06.03.08
02.06.03.09
02.06.03.10
02.06.03.11
02.06.03.12
02.06.03.13
02.06.03.14
02.06.03.15--